(12) United States Patent
Chen et al.

(10) Patent No.: US 12,438,996 B2
(45) Date of Patent: Oct. 7, 2025

(54) VIDEO CALL METHOD AND APPARATUS, AND ELECTRONIC DEVICE AND STORAGE MEDIUM

(71) Applicant: Beijing Zitiao Network Technology Co., Ltd., Beijing (CN)

(72) Inventors: Yuxi Chen, Beijing (CN); Junqiang Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/345,583

(22) Filed: Jun. 30, 2023

(65) Prior Publication Data

US 2023/0388440 A1 Nov. 30, 2023

Related U.S. Application Data

(63) Continuation of application No. PCT/CN2021/142809, filed on Dec. 30, 2021.

(30) Foreign Application Priority Data

Dec. 31, 2020 (CN) .......................... 202011628457.9

(51) Int. Cl.
H04N 5/262 (2006.01)

(52) U.S. Cl.
CPC .................................. *H04N 5/262* (2013.01)

(58) Field of Classification Search
CPC ............. H04N 5/262; H04N 21/4312; H04N 21/4788; H04N 7/147; H04N 7/15;
(Continued)

(56) References Cited

U.S. PATENT DOCUMENTS 9,094,576 B1 7/2015 Karakotsios
2005/0264647 A1 12/2005 Rzeszewski et al.
(Continued)

FOREIGN PATENT DOCUMENTS

| CN | 101018314 A | 8/2007 |
| CN | 103220490 A | 7/2013 |

(Continued)

OTHER PUBLICATIONS

International Search Report issued Mar. 10, 2022 in International Application No. PCT/CN2021/142809 with English translation (4 pages).

(Continued)

*Primary Examiner* — Stella L. Woo

(57) ABSTRACT

Provided are a video call method and apparatus, an electronic device and a storage medium. The method includes: displaying a video call page; in response to receiving a first trigger operation using a first target special effect, determining a first action object of the first target special effect; in response to determining that the first action object includes a target peer user, sending a special effect request to a server to request an acquisition of a first special effect image where the first target special effect is added, where the first special effect image is used for being displayed at a client of at least one user; and in response to receiving the first special effect image forwarded by the server, updating a first video call image displayed in a first display region corresponding to the target peer user as the first special effect image.

14 Claims, 10 Drawing Sheets

(58) Field of Classification Search
CPC .............. H04N 7/141; H04N 21/42653; G06F 3/0481; G06F 3/0482; H04L 12/1827; H04L 65/1089; H04L 65/765
See application file for complete search history.

(56) References Cited

U.S. PATENT DOCUMENTS

| | | | |
|---|---|---|---|
| 2007/0100940 A1* | 5/2007 | Eriksson | H04N 7/15 348/E7.083 |
| 2008/0030621 A1* | 2/2008 | Ciudad | H04N 7/147 348/E5.058 |
| 2012/0206558 A1 | 8/2012 | Setton | |
| 2013/0147904 A1* | 6/2013 | Vivekanandan, | G06T 11/00 348/E7.083 |
| 2015/0046523 A1 | 2/2015 | Keith, Jr. | |
| 2015/0110261 A1 | 4/2015 | Ricci | |
| 2018/0176207 A1* | 6/2018 | Malatesha | H04L 63/083 |
| 2019/0132219 A1* | 5/2019 | Gandhi | H04L 67/535 |
| 2019/0222803 A1* | 7/2019 | Pather | H04L 65/765 |
| 2019/0342522 A1* | 11/2019 | Garrido | H04N 7/147 |
| 2021/0076001 A1* | 3/2021 | Periyannan | H04L 65/403 |

FOREIGN PATENT DOCUMENTS

| | | |
|---|---|---|
| CN | 104219197 A | 12/2014 |
| CN | 107835464 A | 3/2018 |
| CN | 107864357 A | 3/2018 |
| CN | 108366221 A | 8/2018 |
| CN | 109104586 A | 12/2018 |
| CN | 110419041 A | 11/2019 |
| CN | 112788275 A | 5/2021 |
| JP | 7636091 B2 | 2/2025 |
| WO | 2016165615 A1 | 10/2016 |

OTHER PUBLICATIONS

First Office Action issued Jun. 22, 2022 in Chinese Application No. 202011628457.9, with English translation (19 pages).
European Search Report for EP Patent Application No. 21914588.5, Issued on Mar. 26, 2024, 15 pages.
Office action received from Japanese patent application No. 2023-540095 mailed on Jul. 2, 2024, 12 pages (6 pages English Translation and 6 pages Original Copy).
Communication pursuant to Article 94(3) EPC for European Application No. 21914588.5, mailed Dec. 4, 2024, 7 pages.
European Search Report for European Application No. 21914588.5, mailed Jun. 6, 2024, 6 pages.
Written Opinion for International Application No. PCT/CN2021/142809, mailed Mar. 10, 2022, 09 Pages.

\* cited by examiner

VIDEO CALL METHOD AND APPARATUS, AND ELECTRONIC DEVICE AND STORAGE MEDIUM

CROSS-REFERENCE TO RELATED APPLICATIONS

This is a continuation of International Patent Application No. PCT/CN2021/142809, filed on Dec. 30, 2021, which claims priority to Chinese Patent Application No. 202011628457.9 filed on Dec. 31, 2020, the disclosures of which are incorporated herein by reference in their entireties.

TECHNICAL FIELD

Embodiments of the present disclosure relate to the field of computer technology, for example, a video call method and apparatus, an electronic device and a storage medium.

BACKGROUND

At present, a video call function is supported in most kinds of application software with an instant messaging function so that a user can communicate conveniently and quickly.

When making a video call, the user can use a special effect on the user, that is, add a special effect to a video acquired by a camera, so that a local electronic device displays the video with the added special effect and send the video with the added special effect to clients of other users who are making the video call with the user for display.

However, a video call manner in the related art lacks interactivity and is not very interesting, resulting in poor experience when a user is making a video call.

SUMMARY

Embodiments of the present disclosure provide a video call method and apparatus, an electronic device and a storage medium to improve interactivity and interest of a video call process.

In a first aspect, embodiments of the present disclosure provide a video call method. The method includes the steps below.

A video call page is displayed, where the video call page includes a display region of a video call image of at least one user making a video call, where the at least one user includes a local user and a peer user.

In response to receiving a first trigger operation using a first target special effect, a first action object of the first target special effect is determined.

In response to determining that the first action object includes a target peer user, a special effect request is sent to a server to request an acquisition of a first special effect image where the first target special effect is added, where the first special effect image is used for being displayed at a client of the at least one user.

In response to receiving the first special effect image forwarded by the server, a first video call image displayed in a first display region corresponding to the target peer user is updated as the first special effect image.

In a second aspect, embodiments of the present disclosure further provide a video call method. The method includes the steps below.

At least one pending request sent by at least one client establishing a video call connection is received, and a target pending request which is currently pending among the at least one pending request is determined.

In response to determining that the target pending request is a special effect request, special effect identification information of a target special effect which is requested to be added by the special effect request and a target peer user under an action of the target special effect are determined.

A special effect instruction carrying the special effect identification information is generated, and the special effect instruction is sent to a target peer client of the target peer user to instruct the target peer client to display and send a special effect image where the target special effect is added.

In response to receiving the special effect image sent by the target peer client, the special effect image is forwarded to a client other than the target peer client that establishes a video call connection with the target peer client for display.

In a third aspect, embodiments of the present disclosure further provide a video call apparatus. The apparatus includes a first page display module, a first object determination module, a first special effect request module and a first image update module.

The first page display module is configured to display a video call page, where the video call page includes a display region of a video call image of at least one user making a video call, where the at least one user includes a local user and a peer user.

The first object determination module is configured to determine, in response to receiving a first trigger operation using a first target special effect, a first action object of the first target special effect.

The first special effect request module is configured to send, in response to determining that the first action object includes a target peer user, a special effect request to a server to request an acquisition of a first special effect image where the first target special effect is added, where the first special effect image is used for being displayed at a client of the at least one user.

The first image update module is configured to update, in response to receiving the first special effect image forwarded by the server, a first video call image displayed in a first display region corresponding to the target peer user as the first special effect image.

In a fourth aspect, embodiments of the present disclosure further provide a video call apparatus. The apparatus includes a request determination module, an information determination module, an instruction generation module and a special effect image forwarding module.

The request determination module is configured to receive at least one pending request sent by at least one client establishing a video call connection and determine a target pending request which is currently pending among the at least one pending request.

The information determination module is configured to determine, in response to determining that the target pending request is a special effect request, special effect identification information of a target special effect which is requested to be added by the special effect request and a target peer user under an action of the target special effect.

The instruction generation module is configured to generate a special effect instruction carrying the special effect identification information and send the special effect instruction to a target peer client of the target peer user to instruct the target peer client to display and send a special effect image where the target special effect is added.

The special effect image forwarding module is configured to forward, in response to receiving the special effect image sent by the target peer client, the special effect image to a client other than the target peer client which establishes a video call connection with the target peer client for display.

In a fifth aspect, embodiments of the present disclosure further provide an electronic device. The electronic device includes at least one processor and a memory configured to store at least one program.

When executed by the at least one processor, the at least one program causes the at least one processor to implement the video call method according to the embodiments of the present disclosure.

In a sixth aspect, embodiments of the present disclosure further provide a non-transitory computer-readable storage medium storing a computer program which, when executed by a processor, implements the video call method according to the embodiments of the present disclosure.

BRIEF DESCRIPTION OF DRAWINGS

The same or similar reference numerals in the drawings denote the same or similar elements. It is to be understood that the drawings are schematic and that originals and elements are not necessarily drawn to scale.

DETAILED DESCRIPTION

Figure 1:
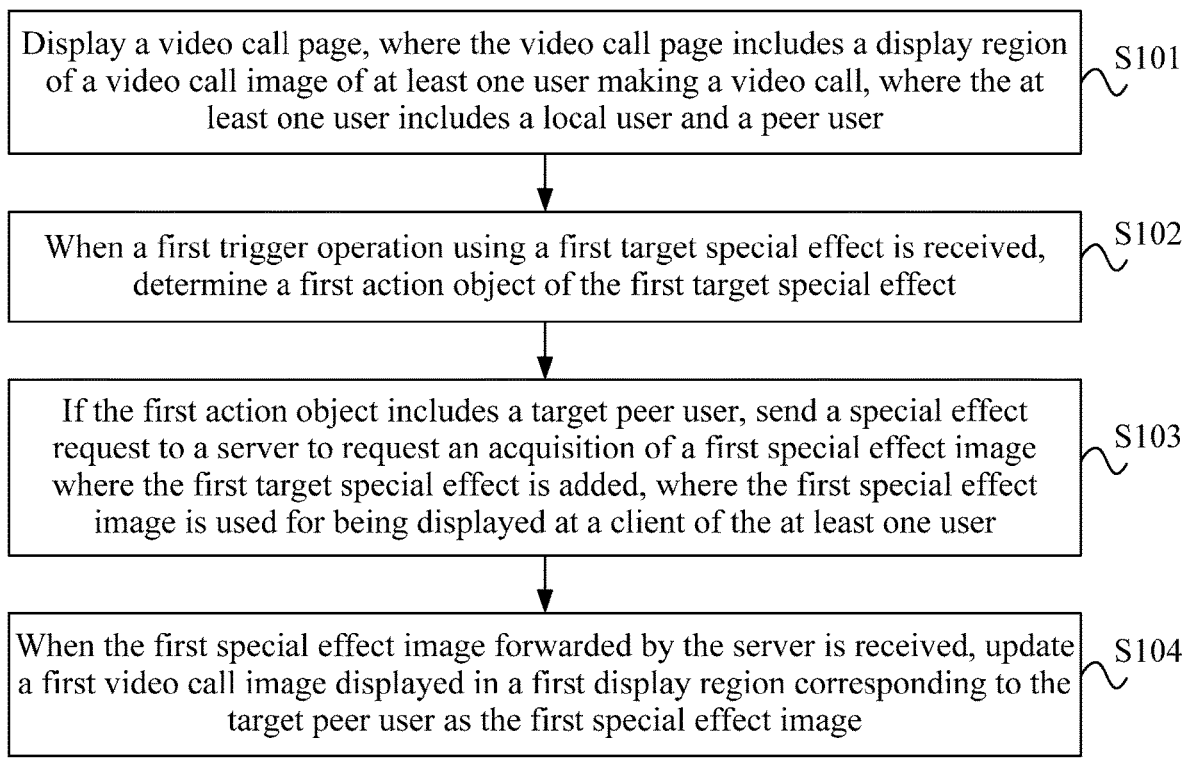
FIG. 1 is a flowchart of a video call method according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that drawings and embodiments of the present disclosure are merely illustrative and are not intended to limit the scope of the present disclosure.

It is to be understood that the multiple steps recorded in the method embodiments of the present disclosure may be performed in a different order, and/or in parallel. In addition, the method embodiments may include additional steps and/or omit performing the illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" mentioned in the present disclosure are intended to be illustrative and not limiting; those skilled in the art should understand that "one" or "a plurality" should be understood as "one or more" unless clearly expressed in the context.

The names of messages or information exchanged between multiple apparatuses in embodiments of the present disclosure are only for illustrative purposes and are not intended to limit the scope of such messages or information.

FIG. 1 is a flowchart of a video call method according to an embodiment of the present disclosure. The method may be performed by a video call apparatus. The apparatus may be implemented in software and/or hardware and may be configured in an electronic device such as a mobile phone or a tablet computer. The video call method provided in the embodiment of the present disclosure is applicable to a scenario of video call. As shown in FIG. 1, the video call method provided in this embodiment may include the steps below.

In S101, a video call page is displayed, where the video call page includes a display region of a video call image of at least one user making a video call, where the at least one user includes a local user and a peer user.

The video call page may be understood as a page used for displaying a video call image when the local user makes a video call with other users. The local user may be a user on an electronic device side that displays the video call page, for example, a user who performs a subsequent trigger operation; correspondingly, the peer user may be a user who makes a video call with the local user. The video call may be a video call in any scenario, for example, a two-person video call (for example, a scenario where the local user and one peer user make a real-time video connection in a closed room), a multi-person video call (for example, a scenario where the local user and multiple peer users make a real-time video connection in a closed room), livestreaming Playing Killing (PK) (for example, a scenario where the local user and one peer user make a real-time video connection in an open room, where the open room can be entered by multiple viewers) or a friend chat room (for example, a scenario where the local user and multiple peer users make a real-time video connection in an open room, where the open room can be entered by multiple viewers).

Figure 2:
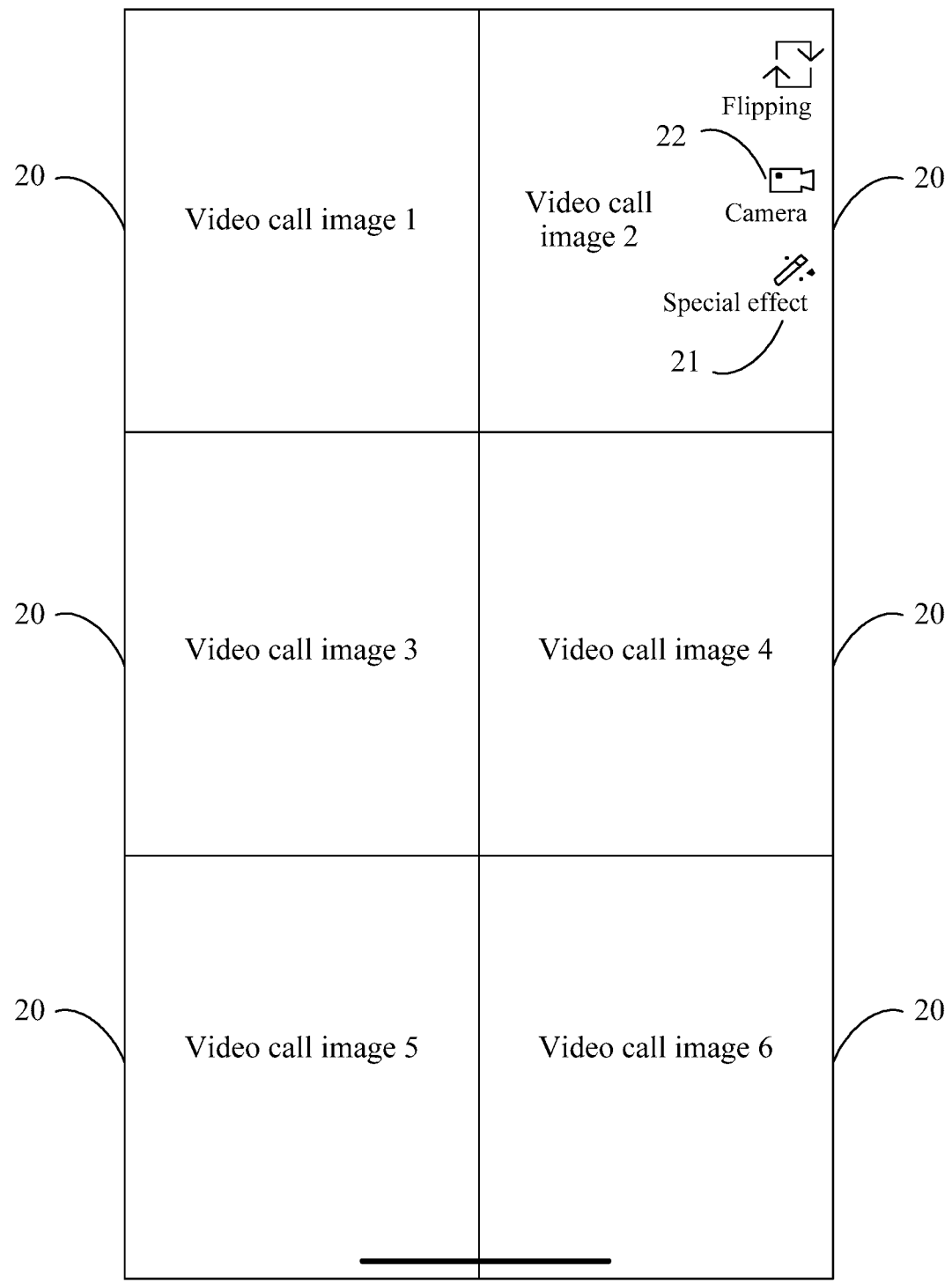
FIG. 2 is a schematic diagram of a video call page according to an embodiment of the present disclosure.

As shown in FIG. 2 (that six users make a video call is used as an example for description in FIG. 2), a video call page may include a display region 20 of each user (including a local user and a peer user) who makes the video call, and a video call image (not shown in FIG. 2) of the user can be displayed in each display region 20. The video call image may be a call image acquired by a camera configured for an electronic device used when the user makes the video call and does not include any special effect, or may be a special effect image formed through the addition of a special effect on the basis of the call image acquired by the camera. The video call image is not limited in this embodiment.

After establishing a communication connection with a peer client, a local client can display the video call page, display a display region of each user on the video call page, and after receiving a video call image of the user sent by a client of a corresponding user, display the video call image of the user in a display region corresponding to the user. Correspondingly, if a video call image of the user sent by a client of a certain user is not received, for example, when the user closes a camera, the video call image of the user may not be displayed, for example, information such as an avatar and a user name of the user may be displayed in a display region corresponding to the user.

In an embodiment, the local user can actively initiate a video call request to establish a video call connection between the local user and a client of a peer user with whom the local user intends to make a video call, for example, a communication connection is established between the local user and the client of the peer user through a server. In this case, before the video call page is displayed, the method may further include: when a fifth trigger operation enabling the local user to make a video call with at least one peer user is received, generating a video call request carrying target user identification information of the at least one peer user, and sending the video call request to the server to request the server to control a peer client to establish a video call connection with a local client through the server, where the peer client is an active client of the at least one peer user.

The fifth trigger operation may be understood as any operation capable of triggering the local user to make a video call with other users, for example, an operation of clicking on a video call control on a certain session page. The target user identification information of the at least one peer user may be understood as user identification information in application software to which a client of the local user where the at least one peer user initiates a video call belongs, and the user identification information may be information such as an identity document (ID) of the user. The active client of the at least one peer user may be understood as a relative active client of the at least one peer user, and the active client is a client where identification information is in a binding relationship with the target user identification information. For example, assuming that the local user initiates a video call in a client of first application software, the target user identification information of the at least one peer user may be user identification information of the at least one peer user in the first application software; assuming that the at least one peer user binds user identification information of the at least one peer user in second application software and application identification information of the at least one peer user in third application software to the target user identification information, the active client of the at least one peer user may be a client of application software where the at least one peer user is the most active among the first application software, the second application software and the third application software. For example, when the at least one peer user is the most active in the second application software, the active client of the at least one peer user may be a client of the second application of the at least one peer user. A determination manner of the activity of the at least one peer user in at least one kind of application software may be flexibly selected, which is not limited in this embodiment.

For example, when making a video call with at least one peer user at a certain client which intends to be installed through a local electronic device, the local user may perform the fifth trigger operation at the client (the local client). Correspondingly, when the local client monitors that the user performs the fifth trigger operation, the video call request carrying the target user identification information of the at least one peer user in the application software to which the client belongs is generated, and the video call request is sent to the server. Therefore, when receiving the video call request sent by the local client, the server can determine the active client of the at least one peer user according to the target user identification information of the at least one peer user carried in the video call request, generate a call connection establishment request, send the call connection establishment request to the active client of the at least one peer user and can establish the video call connection with the local client and the active client of the at least one peer user after receiving connection feedback information sent by the active client of the at least one peer user when the at least one peer user triggers a call control, so as to implement the video call between the local user and the at least one peer user.

In another embodiment, the local client can establish the video call connection with the client of the peer user based on the received call connection establishment request, for example, the video call connection is established between the local client and the client of the peer user through the server. In this case, before the video call page is displayed, the method may further include: when the call connection establishment request sent by the server is received, displaying a call prompt page; and when the trigger operation of the call control acting on the call prompt page is received, generating the connection feedback information to establish the video call connection with the client of the peer user through the server.

The local client receiving the call connection establishment request sent by the server and the client of the peer user may belong to the same kind of application software or different kinds of application software, which may be specifically selected by the server according to the activity of the local user in at least one kind of application software.

For example, when making a video call with the local user, the peer user sends the call connection establishment request to the server through the peer client used by the peer user. After receiving the call connection establishment request sent by the peer user, the server determines an active client of the local user and sends the call connection establishment request to the active client of the local user. When the active client of the local user receives the call connection establishment request sent by the server, the call prompt page is displayed to prompt the local user to make the video call. Therefore, when the local user agrees to make the video call with the peer user, the local user can trigger the call control on the video call prompt page. When the active client of the local user monitors that the user triggers the call control, the active client of the local user generates the connection feedback information identifying that the local user agrees to make the video call and sends the connection feedback information to the server. Therefore, after receiving the connection feedback information, the server can establish the video call connection with the active client of the local user and the peer client used by the peer user.

In S102, when a first trigger operation using a first target special effect is received, a first action object of the first target special effect is determined.

In this embodiment, when making a video call, the local user may use a special effect on the local user or the peer user, that is, the local user may add a special effect to a video call image of the local user (including the case where the special effect added in the video call image is switched), or may control the client of the peer user to add a special effect to a video call image of the peer user through the server. Correspondingly, the peer user may use a special effect on the peer user or other users (including the local user) except the peer user. That is, for each user making the video call, at least one user making the video call can use a special effect on the user. Correspondingly, the special effect added to a video call image of the user can be switched according to a sequence that the at least one user uses the special effect on the user, thereby creating a sense that different users fight against each other with the special effect, improving interactivity and interest when the users are making the video call and further improving the usage experience of the users when making the video call.

The first trigger operation may be a trigger operation for the local user to use a certain special effect, for example, an operation for the local user to click on a special effect cover of a certain special effect displayed in a special effect window. Correspondingly, the first target special effect may be understood as a special effect triggered by the user, for example, a special effect corresponding to a special effect cover clicked by the user. The first action object may be understood as an action object of the first target special effect. The action object may include one or more users making a video call and may be selected and determined before or after the local user performs the first trigger operation, that is, when the client supports the selection of only one action object, the local user may select one user making the video call and use the first target special effect on the one user making the video call, and when the client supports the selection of multiple action objects, the local user may select one or more users making the video call and use the first target special effect on the one or more users making the video call. That the first target special effect is used on a certain user is used as an example for description below.

Figure 3:
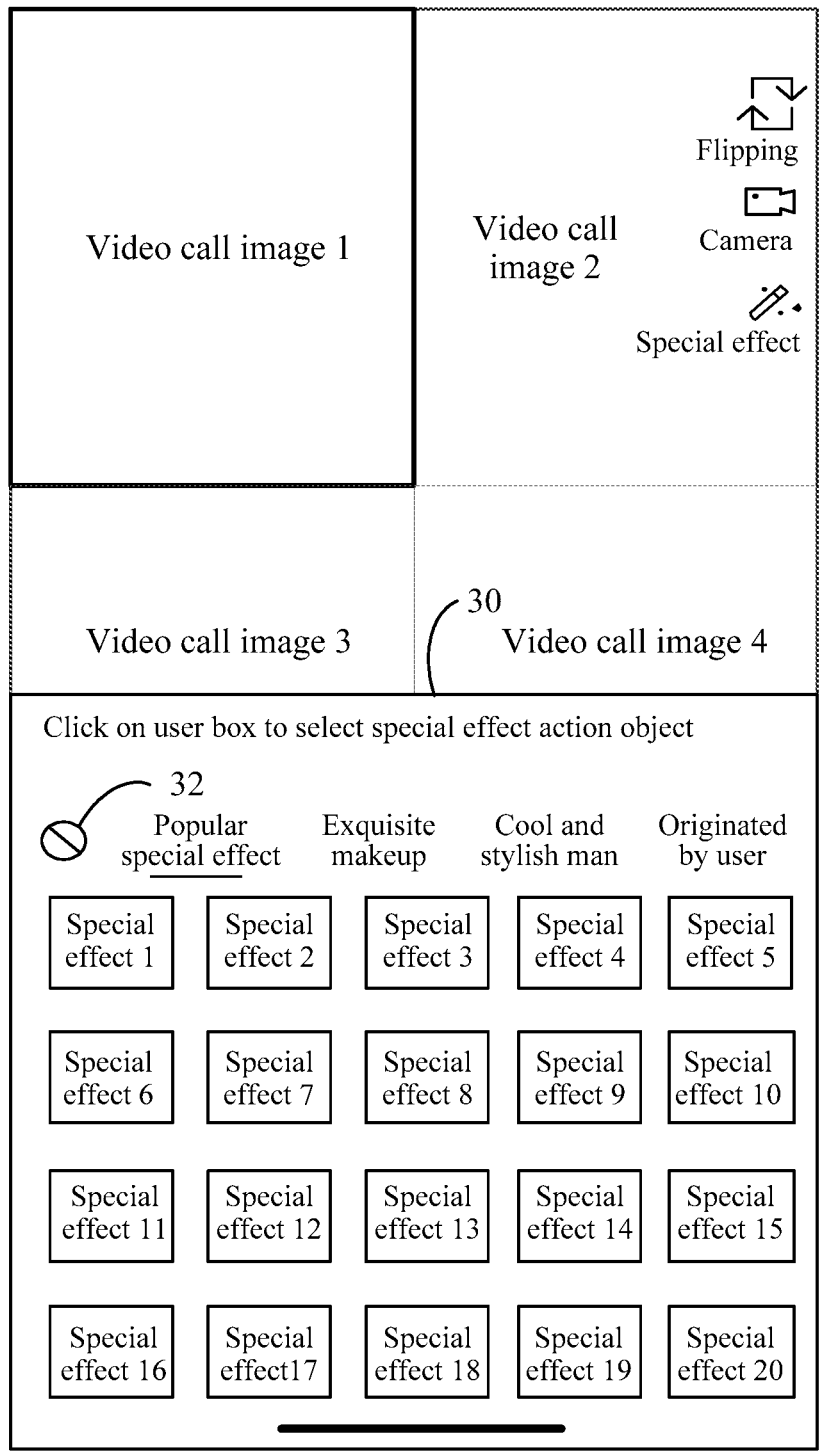
FIG. 3 is a schematic diagram of a special effect window according to an embodiment of the present disclosure.
Figure 4:
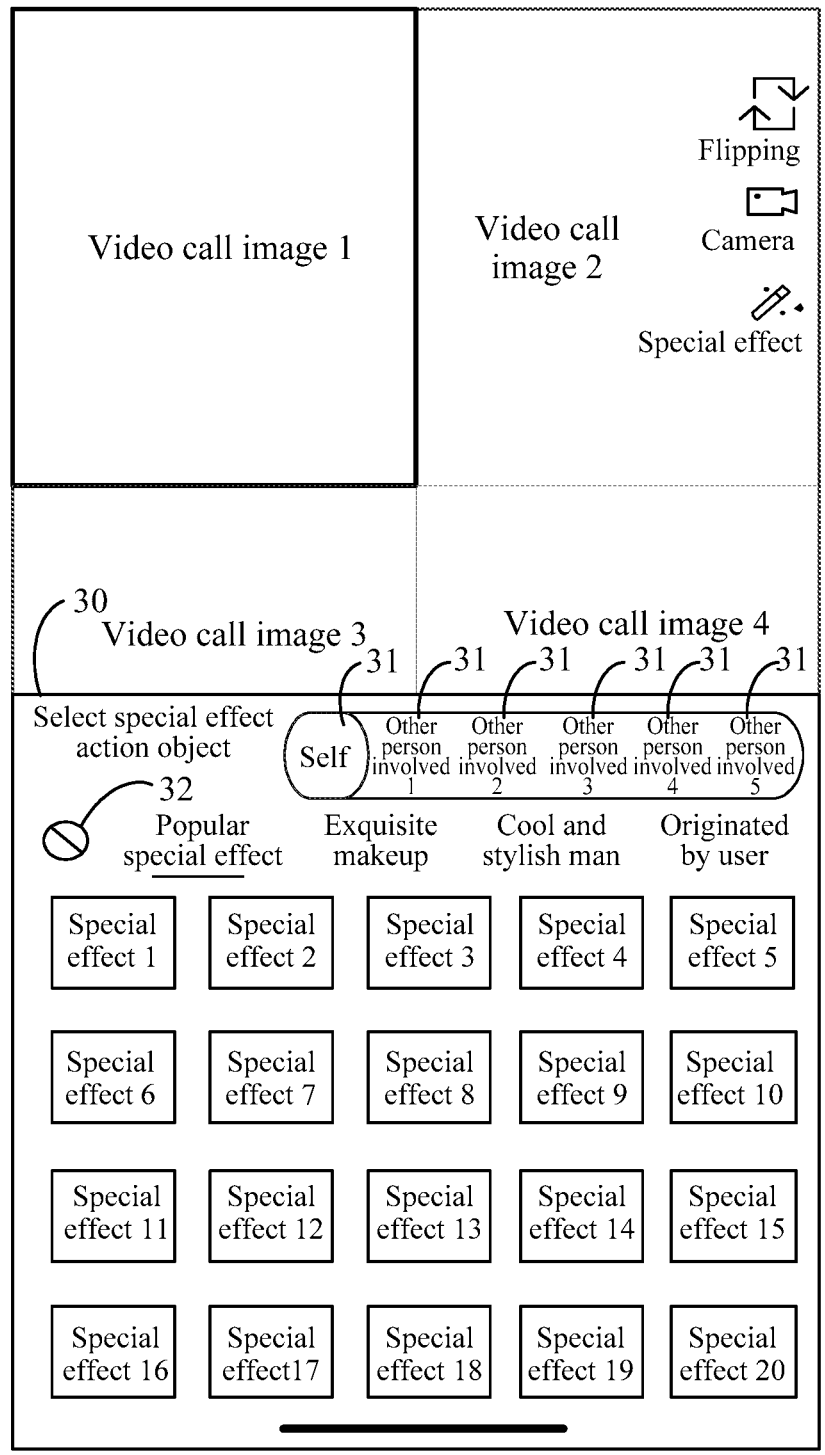
FIG. 4 is a schematic diagram of another special effect window according to an embodiment of the present disclosure.

For example, as shown in FIG. 2, a video call page is displayed in a local client, and a special effect control 21 is displayed in the video call image. When a local user intends to use a special effect on a certain user making a video call, the local user may select the user and click on the special effect control 21. When the local client monitors that the local user clicks on the special effect control 21, a special effect window 30 is displayed, and a special effect cover of at least one special effect is displayed in the special effect window 30, as shown in FIGS. 3 and 4. When the local user intends to use a certain special effect on the user, the local user may click on a special effect cover of the special effect. Correspondingly, when the local client monitors that the local user clicks on the special effect cover of the certain special effect displayed in the special effect window 30, the local client can determine the special effect as the first target special effect and determine the user selected by the local user as the first action object of the first target special effect.

In an embodiment, determining the first action object of the first target special effect includes: determining a user corresponding to a target display region in a selected state as the first action object of the first target special effect; and after the video call page is displayed, the method further includes: when a second trigger operation clicking on the target display region is received, switching the target display region from an unselected state to the selected state.

In the preceding embodiment, the local user can click on a display region corresponding to a certain user who is making a video call to instruct the local client to switch the display region from the unselected state to the selected state, so as to select the user. Therefore, the local client can determine the first action object of the first target special effect by determining the user corresponding to the display region in the selected state.

As shown in FIG. 2, the local client displays a display region corresponding to each user on the video call page. When the local user intends to use a special effect on a certain user, the local user clicks on a display region corresponding to the user on the video call page. When the local client monitors that the local user clicks on a certain display region, the local client determines whether the display region is in the selected state. If the display region is in the unselected state, the display region is switched from the unselected state to the selected state, as shown in FIG. 3 (that a display region at the upper left of the video call page is switched to the selected state is used as an example in FIG. 3), and if the display region is in the selected state, the display region is switched from the selected state to the unselected state. Therefore, when the local client monitors the first trigger operation, the local client can determine the user corresponding to the display region in the selected state as the first action object of the first target special effect.

It is to be noted that the local client may also automatically display the special effect window when switching a certain display region to the selected state. Alternatively, when it is supported that the first target special effect is used on only one user at the same time, the local client may also switch other display regions in the selected state to the unselected state after switching a certain display region from the unselected state to the selected state, which is not limited in this embodiment.

In another embodiment, determining the first action object of the first target special effect includes: determining a user corresponding to a target user control in a selected state as the first action object of the first target special effect; and after the video call page is displayed, the method further includes: displaying a user control corresponding to each of the at least one user; and when a third trigger operation clicking on the target user control, switching the target user control from an unselected state to the selected state.

In the preceding embodiment, the local user can click on a user control corresponding to a certain user who is making a video call to instruct the local client to switch the user control of the user from the unselected state to the selected state, so as to select the user. Therefore, the local client can determine the first action object of the first target special effect by determining the user corresponding to the user control in the selected state.

As shown in FIG. 4 (that a user control corresponding to a local user is in the selected state is used as an example in FIG. 4), a special effect window 30 is displayed in a local client, and a user control 31 of at least one user making a video call is displayed in the special effect window 30. When the local user intends to use a special effect on a certain user, the local user clicks on a user control 31 of the user. When the local client monitors that the local user clicks on a certain user control 31, the local client determines whether the user control 31 is in the selected state. Based on a determination result that the user control is in the selected state, the user control 31 is switched from the selected state to the unselected state, and based on a determination result that the user control is not in the selected state, the user control 31 is switched from the unselected state to the selected state. Therefore, when the local client monitors the first trigger operation, the local client can determine the user corresponding to the user control 31 in the selected state as the first action object of the first target special effect.

It is to be noted that when it is supported that the first target special effect is used on only one user at the same time, the local client may also switch other user controls in the selected state to the unselected state after switching a certain user control from the unselected state to the selected state, which is not limited in this embodiment.

In addition, as shown in FIG. 2, a camera control 22 for turning the camera on/off by the local user may be disposed in the video call image. The local user may switch the camera from an on state to an off state or switch the camera from the off state to the on state by clicking on the camera control 22. When the local user turns off the camera, since the call image of the local user acquired by the camera cannot be acquired, the video call image of the local user may not be displayed in a display region corresponding to the local user. Since a special effect cannot be added to the video call image of the user when there is no video call image, when a video call image of a certain user who is making a video call cannot be acquired by the local client, the local client may set a display region or user control corresponding to the user to an non-selectable state, that is, the local client does not respond to a trigger operation of selecting the display region or user control corresponding to the user by the user, so as to avoid the user using the special effect on the user. Alternatively, after determining the first action object of the first target special effect, the local client may determine whether a video call image of the first action object can be acquired, and when the local client determines that the video call image of the first action object cannot be acquired, the local client does not respond to the first trigger operation of the local user. That each user who is making a video call turns on a camera is used as an example for description.

In S103, if the first action object includes a target peer user, a special effect request is sent to a server to request an acquisition of a first special effect image where the first target special effect is added, where the first special effect image is used for being displayed at a client of the at least one user.

The target peer user may be understood as a peer user included in the first object, that is, a peer user under an action of the first target special effect. The special effect request can carry identification information of the target peer user (for example, user identification information of the target peer user in the application software to which the local client belongs or user identification information of the target peer user in the application software to which the peer client belongs) and special effect identification information of the first target special effect, which can be used for requesting the server to control a target peer client to add the first target special effect to a video call image of the target peer user.

After determining the first action object of the first target special effect, the local client determines whether the first action object includes the peer user. When the first action object includes the peer user, the local client generates the special effect request carrying the user identification information of the peer user and the special effect identification information of the first target special effect and sends the special effect request to the server. Correspondingly, after receiving the special effect request, the server may generate a special effect instruction carrying the special effect identification information of the first target special effect and send the special effect instruction to the target peer client of the target peer user. Therefore, after receiving the special effect instruction sent by the server, the target peer client may add the first target special effect to a call image acquired by a camera on a target peer client side based on the special effect instruction to form the first special effect image, display the first special effect image and send the first special effect image to the server. Alternatively, after receiving the special effect request, the server may acquire the call image acquired by the camera on the target peer client side of the target peer user, add the first target special effect to the call image to form the first special effect image and send the first special effect image as the video call image of the target peer user to the local client and at least one client (including the target peer client) establishing a video call connection with the local client for display.

Correspondingly, if the first action object includes the local user, the first target special effect may be added to a call image acquired by a local camera to form a special effect image of the local user, a video call image displayed in a display region corresponding to the local user is switched to the special effect image, and the special effect image is sent as the video call image of the local user to the server so that the server forwards the special effect image to a peer client of the peer user who is making a video call with the local user for display. Alternatively, if the first action object includes the local user, a special effect request carrying user identification information of the local user and the special effect identification information of the first target special effect may be sent to the server; correspondingly, after receiving the special effect request, the server may acquire the call image acquired by the camera on the local client side, add the first target special effect to the call image to form the first special effect image and send the first special effect image as the video call image of the local user to the local client and at least one client establishing a video call connection with the local client for display.

In S104, when the first special effect image forwarded by the server is received, a first video call image displayed in a first display region corresponding to the target peer user is updated as the first special effect image.

The first display region may be understood as a display region corresponding to the target peer user on the video call page, that is, a display region for displaying the video call image of the target peer user on the video call page. The first video call image may be understood as the video call image of the target peer user.

The target peer client sends the first special effect image as the video call image of the target peer user to the server. After receiving the first special effect image sent by the target peer client, the server sends the first special effect image as the video call image of the target peer user to a client (including the local client) of at least one user who is making a video call with the target peer user. Therefore, the local client can receive the first special effect image sent by the server to the local client and display the first special effect image in the first display region corresponding to the target peer user, that is, update the first video call image displayed in the first display region as the first special effect image.

According to the video call method provided in this embodiment, the video call page is displayed, the display region corresponding to the local user and the peer user who are making the video call is displayed in the video call page, and a video call image of a corresponding user is displayed in each display region; when the first trigger operation using the first target special effect is received, the first action object of the first target special effect is determined; if the first action object includes the target peer user, the special effect request is sent to the server to request the acquisition of the first special effect image including the first target special effect, where the first special effect image is used for being displayed at the client of the at least one user making the video call; further, when the first special effect image forwarded by the server is received, the first video call image displayed in the first display region corresponding to the target peer user is updated as the first special effect image. In this embodiment, through the use of the above technical solution, a special effect can be used on the peer user who is making a video call, and at least one user who is making the video call can see a video call image after the special effect is used on the peer user, thereby improving the interactivity and interest of the video call and further improving the video call experience of the user.

Figure 5:
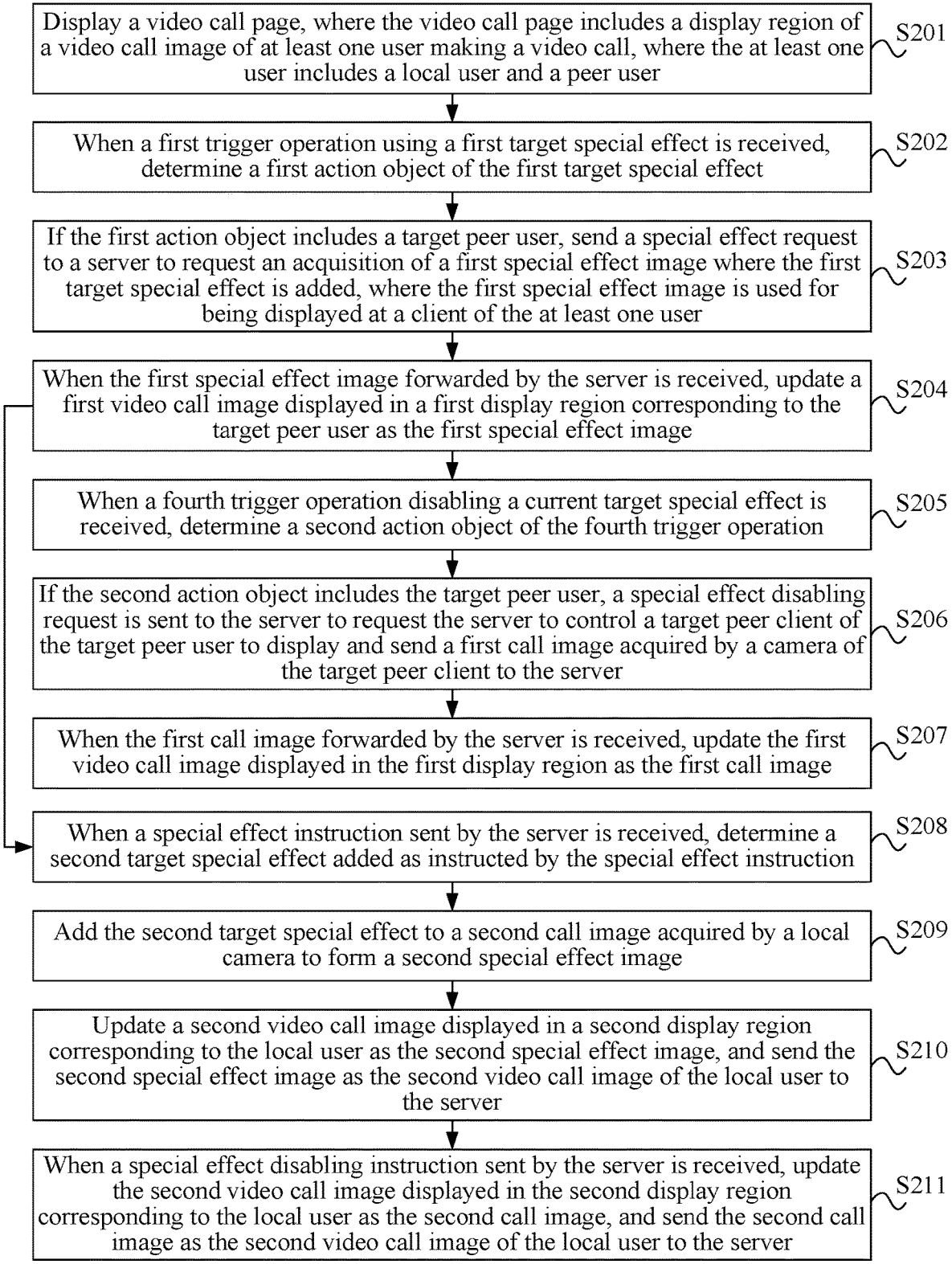
FIG. 5 is a flowchart of another video call method according to an embodiment of the present disclosure.

FIG. 5 is a flowchart of another video call method according to an embodiment of the present disclosure. Solution in this embodiment may be combined with one or more example solutions in the preceding embodiment. After the first video call image displayed in the first display region corresponding to the target peer user is updated as the first special effect image, the method further includes: when a fourth trigger operation disabling a current target special effect is received, determining a second action object of the fourth trigger operation; if the second action object includes the target peer user, sending a special effect disabling request to the server to request the server to control a target peer client of the target peer user to display and send a first call image acquired by a camera of the target peer client to the server; and when the first call image forwarded by the server is received, updating the first video call image displayed in the first display region as the first call image.

The video call method provided in this embodiment further includes: when a special effect instruction sent by the server is received, determining a second target special effect added as instructed by the special effect instruction; adding the second target special effect to a second call image acquired by a local camera to form a second special effect image; updating a second video call image displayed in a second display region corresponding to the local user as the second special effect image, and sending the second special effect image as the second video call image of the local user to the server.

The video call method provided in this embodiment further includes: when a special effect disabling instruction sent by the server is received, updating the second video call image displayed in the second display region corresponding to the local user as the second call image, and sending the second call image as the second video call image of the local user to the server.

Correspondingly, as shown in FIG. 5, the video call method provided in this embodiment may include steps below.

In S201, a video call page is displayed, where the video call page includes a display region of a video call image of at least one user making a video call, where the at least one user includes a local user and a peer user.

In S202, when a first trigger operation using a first target special effect is received, a first action object of the first target special effect is determined.

In S203, if the first action object includes a target peer user, a special effect request is sent to a server to request an acquisition of a first special effect image where the first target special effect is added, where the first special effect image is used for being displayed at a client of the at least one user.

In S204, when the first special effect image forwarded by the server is received, a first video call image displayed in a first display region corresponding to the target peer user is updated as the first special effect image, and S205 or S208 is performed.

In S205, when a fourth trigger operation disabling a current target special effect is received, a second action object of the fourth trigger operation is determined.

In S206, if the second action object includes the target peer user, a special effect disabling request is sent to the server to request the server to control a target peer client of the target peer user to display and send a first call image acquired by a camera of the target peer client to the server.

In this embodiment, each user making a video call can add a special effect to video call images of other users making the video call, or may switch or delete the special effect added to the video call images of the other users making the video call. For example, when a user does not like a special effect added to a video call image of a certain user, the user may switch the special effect added to the video call image to other special effects or delete the special effect added to the video call image, so as to improve the video call experience of the user.

The fourth trigger operation may be a trigger operation for deleting a special effect added to a video call image of one or more users who are making a video call, for example, an operation of clicking on a disabling control. Correspondingly, the second action object is a user of which the local user intends to delete a special effect added to a video call image, for example, the target peer user. The target peer client may be a client used by the target peer user when making a video call with the local user. The first call image may be understood as an image acquired by the camera of the target peer client where no special effect is added.

As shown in FIGS. 3 and 4, the special effect window 30 is displayed in the local client, and a disabling control 32 is displayed in the special effect window 30. When the local user intends to delete a special effect added to a video call image of a certain user (for example, a target peer user) who is making a video call, the local user can click on the disabling control 32 displayed in the special effect window 30 after instructing the local client to switch a display region/user control corresponding to the user to the selected state. When the local client monitors that the user clicks on the disabling control 32, the local client determines that the fourth trigger operation is received, determines the user corresponding to the display region/user control currently in the selected state as the second action object and determines whether the second action object includes a peer user. If the second action object includes the peer user, the local client generates a special effect disabling request carrying user identification information of the peer user and sends the special effect disabling request to the server. Correspondingly, after receiving the special effect disabling request, the server may determine a peer client that needs to delete the special effect in a video call image based on the user identification information carried in the special effect disabling request, generate a special effect disabling instruction and send the special effect disabling instruction to the peer client. Therefore, after receiving the special effect disabling instruction sent by the server, the peer client may use a call image acquired by a camera of the peer client where no special effect is added as the video call image of the peer client, display the call image and send the call image to the server.

Correspondingly, if the second action object includes the local user, a video call image of the local user displayed in a display region corresponding to the local user may be updated as a call image acquired by a local camera, and the call image may be sent as the video call image of the local user to the server so that the server forwards the call image to a client of the peer user establishing a video call connection with the local client for display.

In S207, when the first call image forwarded by the server is received, the first video call image displayed in the first display region is updated as the first call image, and the operation is ended.

When receiving a call image sent by a certain peer client (for example, the target peer client), the server forwards the call image as a video call image of a peer user corresponding to the peer client to at least one client (including a local client) which establishes a video call connection with the peer client. Correspondingly, when receiving the call image of the certain peer user sent by the server to the local client, the local client updates a video call image displayed in a display region corresponding to the user as the call image.

In S208, when a special effect instruction sent by the server is received, a second target special effect added as instructed by the special effect instruction is determined.

The special effect instruction can be used for instructing a client which is making a video call to display and send a video call image where a corresponding special effect is added, and the video call image can be generated and sent by the server when the server receives special effect requests sent by other clients which are making the video call. The second target special effect may be understood as a special effect added as instructed by the special effect instruction.

For example, the peer client generates a special effect request carrying user identification information of the local user and special effect identification information of the second target special effect to be added based on a corresponding trigger operation of the peer user and sends the special effect request to the server. After receiving the special effect request sent by the peer client, the server determines that the special effect request includes the user identification information of the local user, generates a special effect instruction carrying the special effect identification information of the second target special effect and sends the special effect instruction to the local client. Correspondingly, after receiving the special effect instruction sent by the server, the local client can parse the special effect instruction to obtain the special effect identification information carried in the special effect instruction and determine a special effect corresponding to the special effect identification information as the second target special effect added as instructed by the special effect instruction.

In S209, the second target special effect is added to a second call image acquired by a local camera to form a second special effect image.

The second call image may be understood as an image acquired by the local camera, that is, an image acquired by a camera installed on a local electronic device where the local client is located.

The local client acquires the second call image acquired by the local camera and adds the second target special effect to the second call image. For example, when the second target special effect is a retouching special effect, the second target special effect may be used for processing the second call image, and when the second target special effect is a prop special effect, an image of the prop special effect may be superimposed on an upper layer of the second call image to obtain the second special effect image.

In S210, a second video call image displayed in a second display region corresponding to the local user is updated as the second special effect image, and the second special effect image is sent as the second video call image of the local user to the server.

The second display region may be understood as a display region corresponding to the local user on the video call page, that is, a display region for displaying a video call image of the local user on the video call page. The second video call image may be understood as the video call image of the local user.

After obtaining the second special effect image, the local client can update the second video call image displayed in the second display region of the video call page as the second special effect image and send the second special effect image as the second video call image of the local user to the server. Correspondingly, after receiving the second special effect image sent by the local client, the server can send the second special effect image to a peer client of at least one peer user who is making a video call with the local user. Therefore, after receiving the second special effect image forwarded by the server, the peer client can update the second video call image of the local user displayed by the peer client as the second special effect image.

In S211, when a special effect disabling instruction sent by the server is received, the second video call image displayed in the second display region corresponding to the local user is updated as the second call image, and the second call image is sent as the second video call image of the local user to the server.

The special effect disabling instruction can be used for instructing a client which is making a video call to display and send a video call image where no special effect is added, and the video call image can be generated and sent by the server when the server receives special effect disabling requests sent by other clients which are making the video call.

In this embodiment, the local user may control the peer client to display and send a video call image of the peer user where no special effect is added through the server, and the peer user may also control the local client to display and send a video call image of the local user where no special effect is added.

For example, the peer client generates a special effect disabling request carrying the user identification information of the local user based on the corresponding trigger operation of the peer user and sends the special effect disabling request to the server. After receiving the special effect disabling request sent by the peer client, the server determines that the special effect disabling request includes the user identification information of the local user, generates a special effect disabling instruction and sends the special effect disabling instruction to the local client. Correspondingly, after receiving the special effect disabling instruction sent by the server, the local client can use the second call image acquired by the local camera as the second video call image of the local user, update the second video call image displayed in the second display region corresponding to the local user as the second call image and send the second call image to the server. Correspondingly, after receiving the second call image sent by the local client, the server can send the second call image as the second video call image of the local user to a peer client of a peer user who is making a video call with the local user for display.

According to the video call method provided in this embodiment, each user who is making a video call may control a client of any user who is making the video call with the user to display and send a video call image including a special effect, or may control the client of any user who is making the video call with the user to display and send a video call image not including a special effect, so that when the user does not like a certain special effect, the user can control a corresponding client to send a video call image not including the special effect, thereby improving the experience of the user when making the video call.

Figure 6:
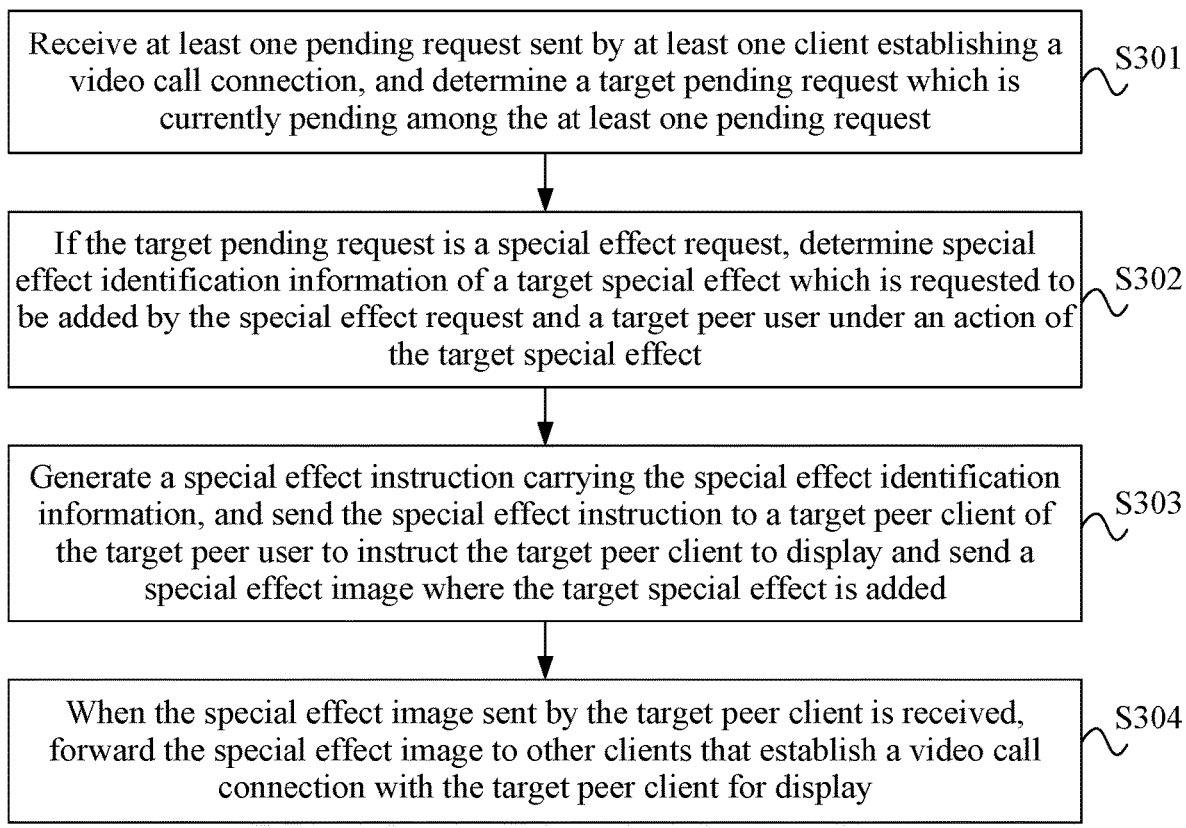
FIG. 6 is a flowchart of another video call method according to an embodiment of the present disclosure.

FIG. 6 is a flowchart of a video call method according to an embodiment of the present disclosure. The method may be performed by a video call apparatus. The apparatus may be implemented in software and/or hardware and may be configured in an electronic device such as a server. The video call method provided in the embodiment of the present disclosure is applicable to a scenario of video call. As shown in FIG. 6, the video call method provided in this embodiment may include the steps below.

In S301, at least one pending request sent by at least one client establishing a video call connection is received, and a target pending request which is currently pending among the at least one pending request is determined.

The at least one pending request may be understood as a request received by a server which needs to be processed, for example, a special effect request and/or a special effect disabling request which is sent by the at least one client establishing the video call connection and needs to be processed.

The server receives the at least one pending request sent by the at least one client establishing the video call connection and determines a pending request which needs to be processed at a current time moment as the target pending request according to a preset determination rule. Here, the preset determination rule for determining the target pending request may be set as needed, for example, a pending request sent by a client with a highest priority may be selected as the target pending request according to a sequence of priority of the at least one client which sends the at least one pending request from high to low. Alternatively, an earliest received pending request which has not been processed at present is used as the target pending request, so as to create an atmosphere that users fight against each other with special effects, thereby improving an interest when the users are making a video call. In this case, determining the target pending request which is currently pending among the at least one pending request includes: determining a pending request whose receiving time is earliest as the target pending request which is currently pending according to a sequence of receiving time of the at least one pending request.

In S302, if the target pending request is a special effect request, special effect identification information of a target special effect which is requested to be added by the special effect request and a target peer user under an action of the target special effect are determined.

The special effect request can be sent by a client making a video call and can be used for requesting the server to display and send a video call image including a corresponding special effect to one or more other peer clients making the video call with the client. The target special effect may be understood as a special effect that the client sending the special effect request requests other clients to add, such as the first target special effect or the second target special effect in the preceding embodiment. The target peer user may be understood as an end user whose video call image is requested to be added a special effect by the client sending the special effect request.

The client sends the special effect request to the server. When processing a received special effect request sent by a certain client, the server can parse the special effect request to obtain special effect identification information of a target special effect and user identification information of a target peer user carried in the special effect request.

In an embodiment, before the at least one pending request sent by the at least one client establishing the video call connection is received and the target pending request which is currently pending is determined, the method may further include: when a video call request sent by any client is received, acquiring target user identification information of a peer user carried in the video call request; and determining an active client of the peer user according to the target user identification information, using the active client as a peer client of the peer user, and sending a call connection establishment request to the peer client to establish a video call connection between the client sending the video call request and the peer client.

In the preceding embodiment, after receiving a video call request sent by a certain client, the server may select a most active client of a peer user who is requested to make a video call by the video call request to send a call connection establishment request, so as to improve a reach rate of the call connection establishment request, reduce a probability that the peer user cannot receive the call connection establishment request sent by the server (for example, the peer user has offloaded the corresponding client), further improve a probability that the user who sends the video call request successfully makes the video call with the peer user and improve the video call experience of the user.

The video call request can be used for requesting the server to establish a video call connection between the user and the client of the peer user. The video call request can be sent by the user who has a video call requirement with other users through a client which is logged in by the user. The video call request may carry user identification information (target user identification information) of the peer user who needs to establish the video call connection in application software to which the client sending the video call request belongs, and may also carry user identification information of the local user (the user sending the video call request).

For example, when the local user has a video call requirement with other users, the local user sends a video call request carrying user identification information of the local user in application software to which a local client belongs and target user identification information of the other users in the application software to which the local client belongs to the server through the local client; after receiving the video call request sent by the local client, the server parses the video call request to obtain target user identification information of a peer user carried in the video call request, determines an active client of the peer user according to the target user identification information, determines the active client as a peer client to be called by the peer user and sends a call connection establishment request carrying the user identification information of the local user sending the video call request to the peer client. Therefore, after receiving the call connection establishment request sent by the server, the peer client can display a call prompt page, and receive or reject the call connection establishment request sent by the server based on a trigger operation of the peer user on the call prompt page.

In the preceding embodiment, the server can determine the peer client of the peer user according to the activity of the peer user in at least one kind of application software to which the peer user is bound. In this case, determining the active client of the peer user according to the target user identification information may include: acquiring binding user identification information in a binding relationship with the target user identification information to obtain user identification information of the peer user, where the user identification information includes the target user identification information and the binding user identification information, and the binding user identification information and the target user identification information are identification information of the peer user in different kinds of application software; and determining application software with highest activity of the peer user among kinds of application software corresponding to the user identification information as active application software, and determining a client of the active application software as the active client of the peer user.

The binding user identification information may be understood as user identification information bound to the target user identification information of the peer user and may be user identification information of the peer user in other kinds of application software different from the application software to which the client sending the video call request belongs. The active application software may be determined according to online information (such as whether the user is online and/or online frequency) of the user in at least one kind of application software. If the user is in an online state in a certain kind of application software, the certain kind of application software may be determined as the active application software of the user, thereby improving the reach rate of the call connection establishment request, and if the user is in an offline state in the at least one kind of application software, application software with a highest online frequency of the user and/or a shortest length of time from the user is last online may be selected as the active application software of the user. In addition, if there are multiple kinds of application software with the highest degree of activity of the user, one of the multiple kinds of application software may be randomly selected as the active application software, or application software with a highest priority among the multiple kinds of application software with the highest degree of activity may be selected as the active application software according to a preset priority, which is not limited in this embodiment. The priority may be determined based on whether the at least one kind of application software is the application software to which the client initiating the video call request belongs and/or a pre-calculated reach rate of the at least one kind of application software. For example, when the multiple kinds of application software with the highest activity includes the software to which the client initiating the video call request belongs, the application software may be determined as the application software with the highest priority, and/or application software with a highest reach rate among the multiple kinds of application software with the highest activity is determined as the active application software.

For example, after determining the target user identification information of the peer user, the server can acquire the binding user identification information bound to the target user identification information, use the target user identification information and the binding user identification information as the user identification information of the peer user, determine the application software to which the user identification information of the peer user belongs, acquire the activity of the peer user in the at least one kind of application software, determine the application software with the highest activity of the peer user as the active application software and determine the client of the active application software which is logged in by the peer user as the active client of the peer user.

It is to be understood that when the active application software is determined, in addition to considering the degree of activity of the peer user, a binding situation of the local user sending the video call request in the at least one kind of application software may also be considered so that application software to which the local user is already bound and with the highest degree of activity of the peer user is selected as the active application software. In this case, correspondingly, when the called peer client and the local client sending the video call request are clients of different kinds of application software, the user identification information of the local user carried in the call connection establishment request sent by the server may be user identification information of the local user in the active application software, so as to ensure that the peer user can specify the user who initiates the video call request when receiving the video call request.

In S303, a special effect instruction carrying the special effect identification information is generated, and the special effect instruction is sent to a target peer client of the target peer user to instruct the target peer client to display and send a special effect image where the target special effect is added.

The target peer client may be understood as a client that makes a video call with the client sending the special effect and is logged in by the target peer user. The special effect instruction can be used for instructing a corresponding client (for example, the target peer client) to display and send a video call image where a corresponding special effect is added.

After parsing and obtaining the special effect identification information of the target special effect and the user identification information of the target peer user carried in the special effect request, the server can generate the special effect instruction carrying the special effect identification information of the target special effect and send the generated special effect instruction to the target peer client of the target peer user based on the user identification information of the target peer user. Therefore, after receiving the special effect instruction sent by the server, the target peer client can determine the target special effect which needs to be added based on the special effect identification information carried in the special effect instruction, add the target special effect to a call image acquired by a camera of the target peer client to form the special effect image, display the special effect image as the video call image of the target peer user and send the video call image to the server.

It is to be understood that before the server sends the special effect instruction to the target peer client or after the target peer client receives the special effect instruction sent by the server, it can also be determined that whether the target special effect is set in application software to which the target peer client belongs. A subsequent operation continues to be performed based on a determination result that the target special effect is set in the application software to which the target peer client belongs, and the operation can be ended based on a determination result that the target special effect is not set in the application software to which the target peer client belongs.

In S304, when the special effect image sent by the target peer client is received, the special effect image is forwarded to other clients that establish a video call connection with the target peer client for display.

For example, the target peer client sends the special effect image where the target special effect is added to the server based on the special effect instruction sent by the server. After receiving the special effect image sent by the target peer client, the server sends the special effect image as the video call image of the target peer user to at least one client (including the client sending the special effect request)

which establishes a video call connection with the target peer user. Therefore, after receiving the special effect image sent by the server, the at least one client which establishes the video call connection with the target peer client can update the video call image of the target peer user displayed in a display region corresponding to the target peer user as the special effect image.

In an embodiment, the video call method provided in this embodiment may further include: if the target pending request is a special effect disabling request, generating a special effect disabling instruction, and sending the special effect disabling instruction to the target peer client to instruct the target peer client to display and send a call image acquired by a camera of the target peer client as a target video call image; and when the call image sent by the target peer client is received, forwarding the call image to the other clients for display.

The special effect disabling request can be used for requesting the server to control the other clients to display and send a video call image where no special effect is added, and the video call image can be generated and sent by the other clients based on a trigger operation of a user. The special effect disabling instruction can be used for instructing a corresponding client to display and send the video call image where no special effect is added. The target peer user may be understood as a user whose video call image where no special effect is added is requested to be acquired by the special effect disabling request. Correspondingly, the target peer client may be understood as a client which makes a video call connection with a client sending the special effect disabling request and is logged in by the target peer user.

In the preceding embodiment, the server can control the other clients to display and send the video call image where no special effect is added based on the received special effect disabling request. When processing a received special effect disabling request sent by a certain client (the local client), the server can parse the special effect disabling request to obtain the user identification information of the target peer user carried in the special effect disabling request, generate the special effect disabling instruction and send the special effect disabling instruction to the target peer client of the target peer user based on the user identification information of the target peer user. Therefore, after receiving the special effect disabling instruction sent by the server, the target peer client can use the call image acquired by the camera of the target peer client as the video call image of the target peer client, display the call image and send the call image to the server. Correspondingly, after receiving the call image sent by the target peer client, the server can send the call image to at least one client (including the client sending the special effect disabling request) which establishes a video call connection with the target peer user for display.

According to the video call method provided in this embodiment, the at least one pending request sent by the at least one client establishing the video call connection is received, and the target pending request among the at least one pending request is determined; if the target pending request is the special effect request, the special effect identification information of the target special effect which is requested to be added by the special effect request and the target peer user under the action of the target special effect are determined; the special effect instruction carrying the special effect identification information is generated, and the special effect instruction is sent to the target peer client of the target peer user to instruct the target peer client to display and send the special effect image where the target special effect is added; when the special effect image sent by the target peer client is received, the special effect image is forwarded to the other clients which establish the video call connection with the target peer client for display. In this embodiment, through the use of the above technical solution, based on a trigger operation of a user who is making a video call, the peer client which is making the video call is controlled to use a special effect, and multiple users who are making the video call can see a video call image after the peer user uses the special effect, thereby improving the interactivity and interest of the video call and further improving the video call experience of the user.

Figure 7:
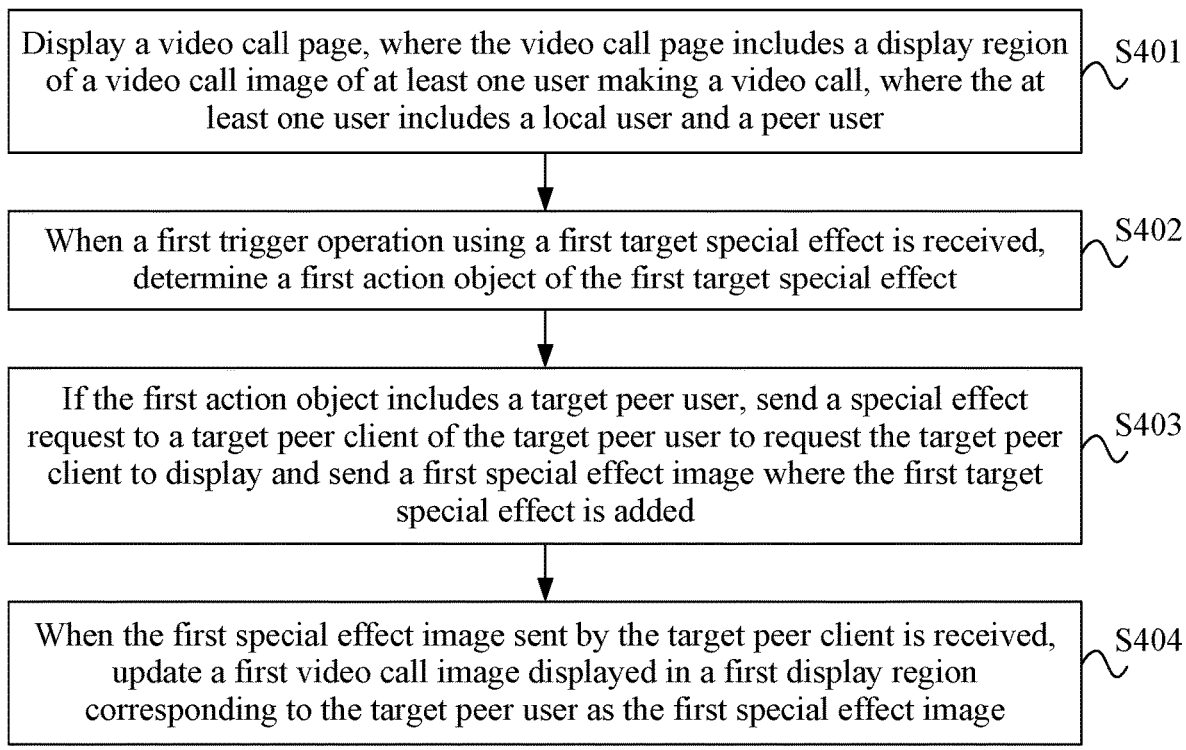
FIG. 7 is a flowchart of another video call method according to an embodiment of the present disclosure.

FIG. 7 is a flowchart of a video call method according to an embodiment of the present disclosure. The method may be performed by a video call apparatus. The apparatus may be implemented in software and/or hardware and may be configured in an electronic device such as a mobile phone or a tablet computer. The video call method provided in the embodiment of the present disclosure is applicable to a scenario of video call. As shown in FIG. 7, the video call method provided in this embodiment may include the steps below.

In S401, a video call page is displayed, where the video call page includes a display region of a video call image of at least one user making a video call, where the at least one user includes a local user and a peer user.

This step is similar to step S101 in the preceding embodiment. For details, reference may be made to the related description of step S101 in the preceding embodiment.

In an embodiment, before the video call page is displayed, the method may further include: when a fifth trigger operation enabling the local user to make a video call with at least one peer user is received, determining an active client of the at least one peer user, using the active client as a peer client of the at least one peer user, and sending a video call request to the peer client to request the peer client to establish a video call connection with a local client.

For example, after receiving the fifth trigger operation, the local client may determine the active client of the at least one peer user or determine the active client of the at least one peer user through a server, use the active client as a peer client to be called of the at least one peer user, acquire a communication address of the peer client sent by the server and send the video call request to the peer client based on the communication address. Therefore, after receiving the video call request sent by the local user, the peer client may accept or reject the video call request based on a trigger operation of the at least one peer user.

In an embodiment, the local client may determine the active client of the at least one peer user by oneself. In this case, determining the active client of the at least one peer user may include: acquiring binding user identification information in a binding relationship with target user identification information of the at least one peer user in application software corresponding to the local client to obtain user identification information of the at least one peer user, where the user identification information includes the target user identification information and the binding user identification information, and the binding user identification information and the target user identification information are identification information of the at least one peer user in different kinds of application software; and determining application software with highest activity of the at least one peer user among at least one kind of application software corresponding to the user identification information as active application software, and determining a client of the active application software as the active client of the at least one peer user.

For example, the local client can first acquire the binding user identification information in the binding relationship with the target user identification information of the at least one peer user in the application software to which the local client belongs and online information (information such as whether the at least one peer user is online and online frequency) of the at least one peer user in the at least one kind of application software corresponding to the user identification information (including the target user identification information and the binding user identification information) from the server. Then, the activity of the at least one peer user in the at least one kind of application software corresponding to the user identification information is determined according to the online information, the application software with the highest activity degree of the at least one peer user is selected as the active application software, and the client of the active application software which is logged in by the at least one peer user is determined as the active client of the at least one peer user.

In S402, when a first trigger operation using a first target special effect is received, a first action object of the first target special effect is determined.

This step is similar to step S102 in the preceding embodiment. For details, reference may be made to the related description of step S102 in the preceding embodiment.

In an embodiment, determining the first action object of the first target special effect includes: determining a user corresponding to a target display region in a selected state as the first action object of the first target special effect; and after the video call page is displayed, the method further includes: when a second trigger operation clicking on the target display region is received, switching the target display region from an unselected state to the selected state.

In another embodiment, determining the first action object of the first target special effect includes: determining a user corresponding to a target user control in a selected state as the first action object of the first target special effect; and after the video call page is displayed, the method further includes: displaying a user control corresponding to each of the at least one user; and when a third trigger operation clicking on the target user control, switching the target user control from an unselected state to the selected state.

In S403, if the first action object includes a target peer user, a special effect request is sent to a target peer client of the target peer user to request the target peer client to display and send a first special effect image where the first target special effect is added.

When determining that the first object includes the peer user, the local client generates the special effect request carrying user identification information of the peer user and special effect identification information of the first target special effect and sends the special effect request to a client (the target peer client) who is making a video call with the peer user. Therefore, after receiving the special effect request sent by the local client, the target peer client can add the first target special effect to a call image acquired by a camera based on the special effect request to form the first special effect image, display the first special effect image and send the first special effect image as a video call image of the target peer user to a client (including the local client) of at least one user who is making a video call with the target peer user.

Correspondingly, if the first action object includes the local user, the first target special effect can be added to a call image acquired by a local camera to form a special effect image of the local user, a video call image displayed in a display region corresponding to the local user is switched to the special effect image, and the special effect image is sent as a video call image of the local user to at least one client which is making a video call with the local client for display.

In S404, when the first special effect image sent by the target peer client is received, a first video call image displayed in a first display region corresponding to the target peer user is updated as the first special effect image.

The local client can receive the first special effect image sent by the target peer client and display the first special effect image in the first display region corresponding to the target peer user, that is, update the first video call image displayed in the first display region as the first special effect image.

According to the video call method provided in this embodiment, the video call image is displayed, the display region corresponding to the local user and the peer user who are making the video call is displayed in the video call image, and a video call image of a corresponding user is displayed in each display region; when the first trigger operation using the first target special effect is received, the first action object of the first target special effect is determined; if the first action object includes the target peer user, the special effect request is sent to the target peer client of the target peer user to request the target peer client to display and send the first special effect image including the first target special effect; further, when the first special effect image sent by the target peer client is received, the first video call image displayed in the first display region corresponding to the target peer user is updated as the first special effect image. In this embodiment, through the use of the above technical solution, not only can a special effect be used on the peer user who is making a video call and at least one user who is making the video call see a video call image after the special effect is used on the peer user, thereby improving the interactivity and interest of the video call, but also can the data transmission pressure of the server be reduced and the update delay of the video call image be reduced, thereby further improving the video call experience of the user.

Figure 8:
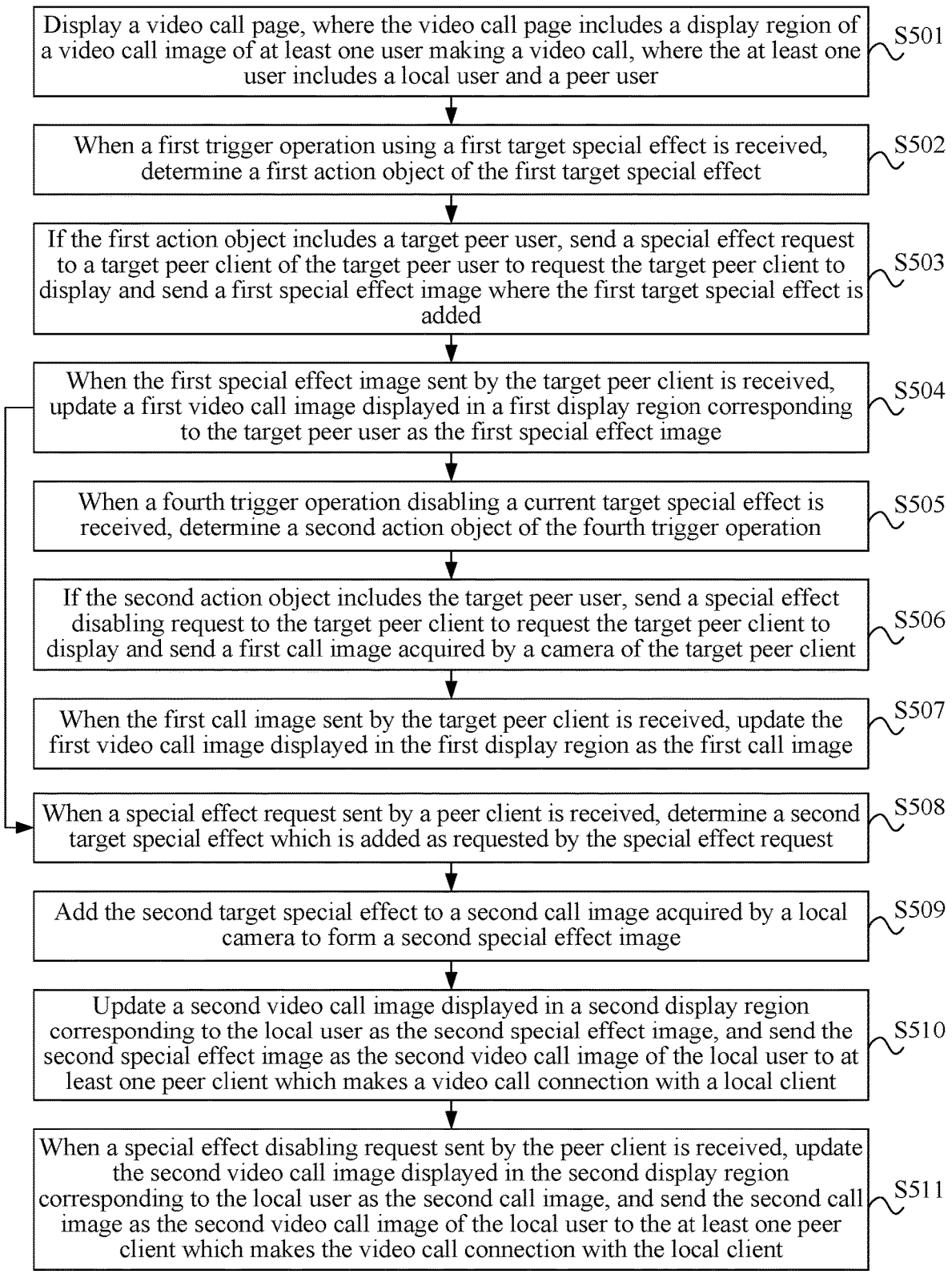
FIG. 8 is a flowchart of another video call method according to an embodiment of the present disclosure.

FIG. 8 is a flowchart of another video call method according to an embodiment of the present disclosure. Solution in this embodiment may be combined with one or more example solutions in the preceding embodiment. After the first video call image displayed in the first display region corresponding to the target peer user is updated as the first special effect image, the method further includes: when a fourth trigger operation disabling a current target special effect is received, determining a second action object of the fourth trigger operation; if the second action object includes the target peer user, sending a special effect disabling request to the target peer client to request the target peer client to display and send a first call image acquired by a camera of the target peer client; and when the first call image sent by the target peer client is received, updating the first video call image displayed in the first display region as the first call image.

The video call method provided in this embodiment may further include: when a special effect request sent by a peer client is received, determining a second target special effect added as requested by the special effect request; adding the second target special effect to a second call image acquired by a local camera to form a second special effect image; updating a second video call image displayed in a second display region corresponding to the local user as the second special effect image, and sending the second special effect image as the second video call image of the local user to at least one peer client which establishes a video call connection with the local client.

The video call method provided in this embodiment may further include: when a special effect disabling request sent by the peer client is received, updating the second video call image displayed in the second display region corresponding to the local user as the second call image, and sending the second call image as the second video call image of the local user to at least one peer client which establishes a video call connection with the local client.

Correspondingly, as shown in FIG. 8, the video call method provided in this embodiment may include steps below.

In S501, a video call page is displayed, where the video call page includes a display region of a video call image of at least one user making a video call, where the at least one user includes a local user and a peer user.

In S502, when a first trigger operation using a first target special effect is received, a first action object of the first target special effect is determined.

In S503, if the first action object includes a target peer user, a special effect request is sent to a target peer client of the target peer user to request the target peer client to display and send a first special effect image where the first target special effect is added.

In S504, when the first special effect image sent by the target peer client is received, a first video call image displayed in a first display region corresponding to the target peer user is updated as the first special effect image, and S505 or S508 is performed.

In S505, when a fourth trigger operation disabling a current target special effect is received, a second action object of the fourth trigger operation is determined.

This step is similar to step S205 in the preceding embodiment. For details, reference may be made to the related description of step S205 in the preceding embodiment.

In S506, if the second action object includes the target peer user, a special effect disabling request is sent to the target peer client to request the target peer client to display and send a first call image acquired by a camera of the target peer client.

For example, when determining that the second action object includes the target peer user, a local client generates the special effect disabling request carrying user identification information of the peer user and sends the special effect disabling request to the target peer client used when the target peer user is making a video call. Therefore, after receiving the special effect disabling instruction sent by the local client, the target peer client can use a call image without adding any special effect acquired by the camera of the target peer client as a video call image of the target peer client, display the call image and send the call image as a video call image of the target peer user to at least one client (including the local client) which is making a video call with the target peer client.

Correspondingly, if the second action object includes the local user, a video call image of the local user displayed in a display region of the local user can be updated as a call image acquired by a camera, and the call image is sent as the video call image of the local user to at least one client which is making a video call with the local client for display.

In S507, when the first call image sent by the target peer client is received, the first video call image displayed in the first display region is updated as the first call image.

When receiving the first call image sent by the target peer user to the local client, the local client updates a video call image displayed in a display region corresponding to the target peer user as the first call image.

In S508, when a special effect request sent by a peer client is received, a second target special effect which is added as requested by the special effect request is determined.

For example, the peer client generates the special effect request carrying special effect identification information of the second target special effect to be added based on a corresponding trigger operation of the peer user and sends the special effect request to the local client. Correspondingly, after receiving the special effect request sent by the peer client, the local client parses the special effect request to obtain the special effect identification information carried in the special effect request and determines a special effect corresponding to the special effect identification information as the second target special effect added as requested by the special effect request.

It is to be understood that after determining the second target special effect, the local client can also determine whether the second target special effect is set in application software to which the local client belongs. A subsequent operation continues to be performed based on a determination result that the second target special effect is set in the application software to which the local client belongs, and the operation can be ended based on a determination result that the second target special effect is not set in the application software to which the local client belongs.

In S509, the second target special effect is added to a second call image acquired by a local camera to form a second special effect image.

This step is similar to step S209 in the preceding embodiment. For details, reference may be made to the related description of step S209 in the preceding embodiment.

In S510, a second video call image displayed in a second display region corresponding to the local user is updated as the second special effect image, and the second special effect image is sent as the second video call image of the local user to at least one peer client which makes a video call connection with a local client.

After obtaining the second special effect image, the local client can update the second video call image displayed in the second display region of the video call page as the second special effect image and send the second special effect image as the second video call image of the local user to at least one peer client (including the peer client sending the special effect request) which makes a video call with the local client. Therefore, after receiving the second special effect image sent by the local client, the at least one peer client can update the second video call image of the local user displayed by the at least one peer client as the second special effect image.

In S511, when a special effect disabling request sent by the peer client is received, the second video call image displayed in the second display region corresponding to the local user is updated as the second call image, and the second call image is sent as the second video call image of the local user to the at least one peer client which makes the video call connection with the local client.

For example, the peer client generates the special effect disabling request carrying user identification information of the local user based on a corresponding trigger operation of the peer user and sends the special effect disabling request to the local client. After receiving a special effect disabling request sent by a certain peer client, the local client uses the second call image acquired by the local camera as the second video call image of the local user, updates the second video call image displayed in the second display region corresponding to the local user as the second call image and sends the second call image to at least one peer client (including the peer client sending the special effect disabling request to the local client) which is making a video call with the local client for display.

According to the video call method provided in this embodiment, at least one user who is making a video call may control a client of any user who is making the video call to display and send a video call image including a special effect, or may control the client of any user who is making the video call to display and send a video call image not including a special effect, so that when the user does not like a certain special effect, the user can control a corresponding client to send a video call image not including the special effect, thereby improving the experience of the user when making the video call.

Figure 9:
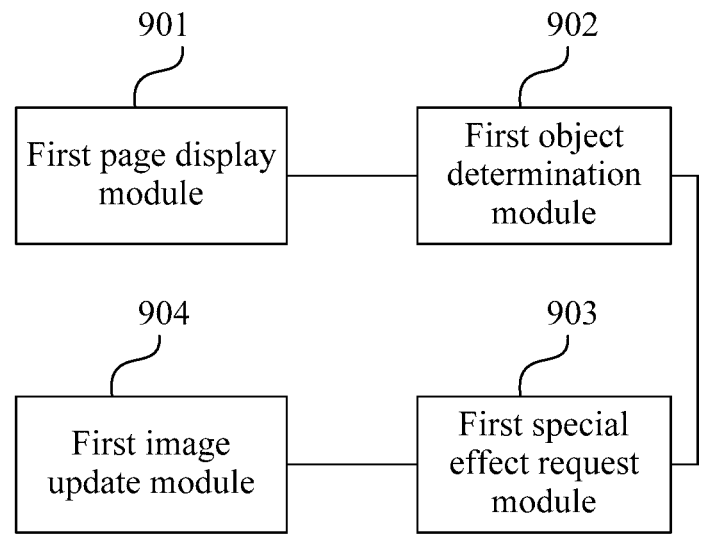
FIG. 9 is a block diagram of a video call apparatus according to an embodiment of the present disclosure.

FIG. 9 is a block diagram of a video call apparatus according to an embodiment of the present disclosure. The apparatus may be implemented in software and/or hardware and may be configured in an electronic device such as a mobile phone or a tablet computer. The apparatus can perform a video call method to make a video call. As shown in FIG. 9, the video call apparatus provided in this embodiment may include a first page display module 901, a first object determination module 902, a first special effect request module 903 and a first image update module 904.

The first page display module 901 is configured to display a video call page, where the video call page includes a display region of a video call image of at least one user making a video call, where the at least one user includes a local user and a peer user.

The first object determination module 902 is configured to determine, when receiving a first trigger operation using a first target special effect, a first action object of the first target special effect.

The first special effect request module 903 is configured to send, when the first action object includes a target peer user, a special effect request to a server to request an acquisition of a first special effect image where the first target special effect is added, where the first special effect image is used for being displayed at a client of the at least one user.

The first image update module 904 is configured to update, when receiving the first special effect image forwarded by the server, a first video call image displayed in a first display region corresponding to the target peer user as the first special effect image.

According to the video call apparatus provided in this embodiment, the first page display module displays the video call page, the display region corresponding to the local user and the peer user who are making the video call is displayed in the video call page, and a video call image of a corresponding user is displayed in each display region; the first object determination module determines, when receiving the first trigger operation using the first target special effect, the first action object of the first target special effect; the first special effect request module sends, when the first action object includes the target peer user, the special effect request to the server to request the acquisition of the first special effect image including the first target special effect, where the first special effect image is used for being displayed at the client of the at least one user making the video call; further, the first image update module updates, when receiving the first special effect image forwarded by the server, the first video call image displayed in the first display region corresponding to the target peer user as the first special effect image. In this embodiment, through the use of the above technical solution, a special effect can be used on the peer user who is making a video call, and at least one user who is making the video call can see a video call image after the special effect is used on the peer user, thereby improving the interactivity and interest of the video call and further improving the video call experience of the user.

The first object determination module 902 is configured to determine a user corresponding to a target display region in a selected state as the first action object of the first target special effect when receiving the first trigger operation using the first target special effect. The video call apparatus provided in this embodiment further includes a first region state switching module, which is configured to switch, when receiving a second trigger operation clicking on the target display region after the video call page is displayed, the target display region from an unselected state to the selected state.

The first object determination module 902 is configured to determine a user corresponding to a target user control in a selected state as the first action object of the first target special effect when receiving the first trigger operation using the first target special effect. The video call apparatus provided in this embodiment further includes a first control state switching module, which is configured to display a user control corresponding to each of the at least one user after the video call page is displayed and switch the target user control from an unselected state to the selected state when receiving a third trigger operation clicking on the target user control.

The video call apparatus provided in this embodiment further includes a third object determination module, a first disabling request module and a third image update module. The third object determination module is configured to determine, when receiving a fourth trigger operation disabling a current target special effect after the first video call image displayed in the first display region corresponding to the target peer user is updated as the first special effect image, a second action object of the fourth trigger operation. The first disabling request module is configured to send, when the second action object includes the target peer user, a special effect disabling request to the server to request the server to control a target peer client to display and send a first call image acquired by a camera of the target peer client to the server. The third image update module is configured to update, when receiving the first call image forwarded by the server, the first video call image displayed in the first display region as the first call image.

The video call apparatus provided in this embodiment further includes a first special effect determination module, a first special effect adding module and a first image sending module. The first special effect determination module is configured to determine, when receiving a special effect instruction sent by the server, a second target special effect added as instructed by the special effect instruction. The first special effect adding module is configured to add the second target special effect to a second call image acquired by a local camera to form a second special effect image. The first image sending module is configured to update a second video call image displayed in a second display region corresponding to the local user as the second special effect image and send the second special effect image as the second video call image of the local user to the server.

The video call apparatus provided in this embodiment further includes a first special effect disabling module, which is configured to update, when receiving a special effect disabling instruction sent by the server, the second video call image displayed in the second display region corresponding to the local user as the second call image and send the second call image as the second video call image of the local user to the server.

The video call apparatus provided in this embodiment further includes a first call request module, which is configured to generate, when receiving a fifth trigger operation enabling the local user to make a video call with at least one peer user before the video call page is displayed, a video call request carrying target user identification information of the at least one peer user and send the video call request to the server to request the server to control a peer client to establish a video call connection with a local client through the server, where the peer client is an active client of the at least one peer user.

The video call apparatus provided in the embodiment of the present disclosure may perform the video call method provided in a corresponding embodiment of the present disclosure, and has functional modules and beneficial effects corresponding to the performed video call method. For technical details not described in detail in this embodiment, reference may be made to the video call method provided in the corresponding embodiment of the present disclosure.

Figure 10:
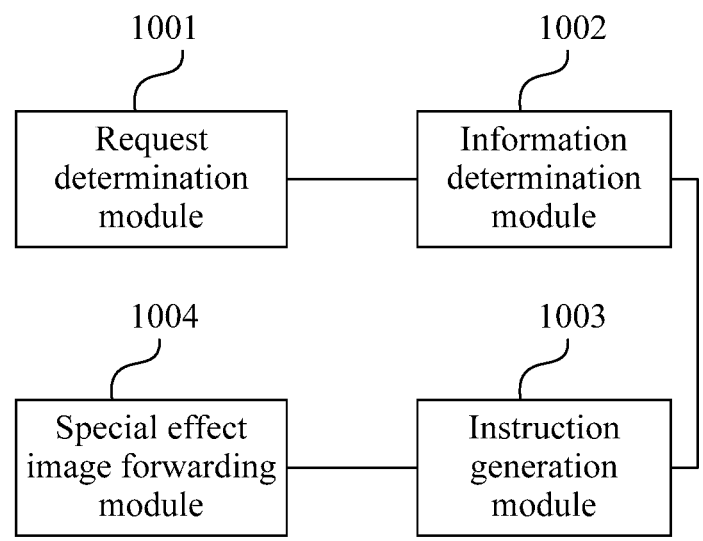
FIG. 10 is a block diagram of another video call apparatus according to an embodiment of the present disclosure.

FIG. 10 is a block diagram of a video call apparatus according to an embodiment of the present disclosure. The apparatus may be implemented in software and/or hardware and may be configured in an electronic device such as a server. The apparatus can perform a video call method to make a video call. As shown in FIG. 10, the video call apparatus provided in this embodiment may include a request determination module 1001, an information determination module 1002, an instruction generation module 1003 and a special effect image forwarding module 1004.

The request determination module 1001 is configured to receive at least one pending request sent by at least one client establishing a video call connection and determine a target pending request which is currently pending among the at least one pending request.

The information determination module 1002 is configured to determine, when the target pending request is a special effect request, special effect identification information of a target special effect which is requested to be added by the special effect request and a target peer user under an action of the target special effect.

The instruction generation module 1003 is configured to generate a special effect instruction carrying the special effect identification information and send the special effect instruction to a target peer client of the target peer user to instruct the target peer client to display and send a special effect image where the target special effect is added.

The special effect image forwarding module 1004 is configured to forward, when receiving the special effect image sent by the target peer client, the special effect image to other clients which establish a video call connection with the target peer client for display.

According to the video call apparatus provided in this embodiment, the at least one pending request sent by the at least one client establishing the video call connection is received, and the target pending request among the at least one pending request is determined; if the target pending request is the special effect request, the special effect identification information of the target special effect which is requested to be added by the special effect request and the target peer user under the action of the target special effect are determined; the instruction generation module generates the special effect instruction carrying the special effect identification information and sends the special effect instruction to the target peer client of the target peer user to instruct the target peer client to display and send the special effect image where the target special effect is added; the special effect image forwarding module forwards, when receiving the special effect image sent by the target peer client, the special effect image to the other clients which are making a video call with the target peer client for display. In this embodiment, through the use of the above technical solution, based on a trigger operation of a user who is making a video call, a peer client which is making the video call is controlled to use a special effect, and at least one user who is making the video call can see a video call image after a peer user uses the special effect, thereby improving the interactivity and interest of the video call and further improving the video call experience of the user.

The video call apparatus provided in this embodiment further includes a disabling module and a call image forwarding module. The disabling module is configured to generate, when the target pending request is a special effect disabling request, a special effect disabling instruction and send the special effect disabling instruction to the target peer client to instruct the target peer client to display and send a call image acquired by a camera of the target peer client as a target video call image. The call image forwarding module is configured to forward, when receiving the call image sent by the target peer client, the call image to the other clients for display.

The request determination module 1001 is configured to receive the at least one pending request sent by the at least one client establishing the video call connection and determine a pending request whose receiving time is earliest as the target pending request which is currently pending according to a sequence of receiving time of the at least one pending request.

The video call apparatus provided in this embodiment further includes an identification acquisition module and a connection request module. The identification acquisition module is configured to acquire, when receiving a video call request sent by any client before the at least one pending request sent by the at least one client establishing the video call connection is received and the target pending request which is currently pending is determined, target user identification information of a peer user carried in the video call request. The connection request module is configured to determine an active client of the peer user according to the target user identification information, use the active client as a peer client of the peer user and send a call connection establishment request to the peer client to establish a video call connection between the client sending the video call request and the peer client.

The connection request module includes a first information acquisition unit and a first client determination unit. The first information acquisition unit is configured to acquire binding user identification information in a binding relationship with the target user identification information to obtain user identification information of the peer user, where the user identification information includes the target user identification information and the binding user identification information, and the binding user identification information and the target user identification information are identification information of the peer user in different kinds of application software. The first client determination unit is configured to determine application software with highest activity of the peer user among kinds of application software corresponding to the user identification information as active application software and determine a client of the active application software as the active client of the peer user.

The video call apparatus provided in the embodiment of the present disclosure may perform the video call method provided in a corresponding embodiment of the present disclosure, and has functional modules and beneficial effects corresponding to the performed video call method. For technical details not described in detail in this embodiment, reference may be made to the video call method provided in the corresponding embodiment of the present disclosure.

Figure 11:
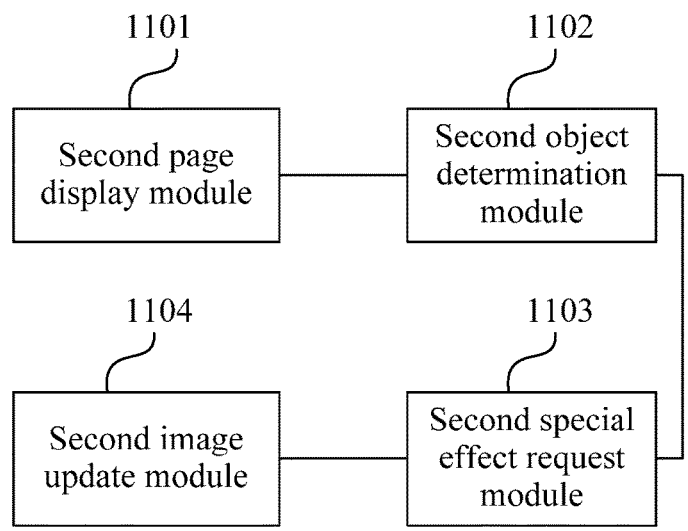
FIG. 11 is a block diagram of another video call apparatus according to an embodiment of the present disclosure.

FIG. 11 is a block diagram of a video call apparatus according to an embodiment of the present disclosure. The apparatus may be implemented in software and/or hardware and may be configured in an electronic device such as a mobile phone or a tablet computer. The apparatus can perform a video call method to make a video call. As shown in FIG. 11, the video call apparatus provided in this embodiment may include a second page display module 1101, a second object determination module 1102, a second special effect request module 1103 and a second image update module 1104.

The second page display module 1101 is configured to display a video call page, where the video call page includes a display region of a video call image of multiple users making a video call, where the multiple users include a local user and a peer user.

The second object determination module 1102 is configured to determine, when receiving a first trigger operation using a first target special effect, a first action object of the first target special effect.

The second special effect request module 1103 is configured to send, when the first action object includes a target peer user, a special effect request to a target peer client of the target peer user to request the target peer client to display and send a first special effect image where the first target special effect is added.

The second image update module 1104 is configured to update, when receiving the first special effect image sent by the target peer client, a first video call image displayed in a first display region corresponding to the target peer user is updated as the first special effect image.

According to the video call apparatus provided in this embodiment, the second page display module displays the video call page, the display region corresponding to the local user and the peer user who are making the video call is displayed in the video call page, and a video call image of a corresponding user is displayed in each display region; the second object determination module determines, when receiving the first trigger operation using the first target special effect, the first action object of the first target special effect; the second special effect request module sends, when the first action object includes the target peer user, the special effect request to the target peer client of the target peer user to request the target peer client to display and send the first special effect image including the first target special effect; further, the second image update module updates, when receiving the first special effect image sent by the target peer client, the first video call image displayed in the first display region corresponding to the target peer user as the first special effect image. In this embodiment, through the use of the above technical solution, not only can a special effect be used on the peer user who is making a video call and at least one user who is making the video call see a video call image after the special effect is used on the peer user, thereby improving the interactivity and interest of the video call, but also can the data transmission pressure of the server be reduced and the update delay of the video call image be reduced, thereby further improving the video call experience of the user.

The second object determination module 1102 is configured to determine a user corresponding to a target display region in a selected state as the first action object of the first target special effect when receiving the first trigger operation using the first target special effect. The video call apparatus provided in this embodiment further includes a second region state switching module, which is configured to switch, when receiving a second trigger operation clicking on the target display region after the video call page is displayed, the target display region from an unselected state to the selected state.

The second object determination module 1102 is configured to determine a user corresponding to a target user control in a selected state as the first action object of the first target special effect when receiving the first trigger operation using the first target special effect. The video call apparatus provided in this embodiment further includes a second control state switching module, which is configured to display a user control corresponding to each of the multiple users after the video call page is displayed and switch the target user control from an unselected state to the selected state when receiving a third trigger operation clicking on the target user control.

The video call apparatus provided in this embodiment further includes a fourth object determination module, a second disabling request module and a fourth image update module. The fourth object determination module is configured to determine, when receiving a fourth trigger operation disabling a current target special effect after the first video call image displayed in the first display region corresponding to the target peer user is updated as the first special effect image, a second action object of the fourth trigger operation. The second disabling request module is configured to send, when the second action object includes the target peer user, a special effect disabling request to the target peer client to request the target peer client to display and send a first call image acquired by a camera of the target peer client. The fourth image update module is configured to update, when receiving the first call image sent by the target peer client, the first video call image displayed in the first display region as the first call image.

The video call apparatus provided in this embodiment further includes a second special effect determination module, a second special effect adding module and a second image sending module. The second special effect determination module is configured to determine, when receiving a special effect request sent by a peer client, a second target special effect added as requested by the special effect request. The second special effect adding module is configured to add the second target special effect to a second call image acquired by a local camera to form a second special effect image. The second image sending module is configured to update a second video call image displayed in a second display region corresponding to the local user as the second special effect image and send the second special effect image as the second video call image of the local user to at least one peer client which establishes a video call connection with a local client.

The video call apparatus provided in this embodiment further includes a second special effect disabling module, which is configured to update, when receiving a special effect disabling request sent by the peer client, the second video call image displayed in the second display region corresponding to the local user as the second call image and send the second call image as the second video call image of the local user to the at least one peer client which establishes the video call connection with the local client.

The video call apparatus provided in this embodiment further includes a second call request module, which is configured to determine, when receiving a fifth trigger operation enabling the local user to make a video call with at least one peer user before the video call page is displayed, an active client of the at least one peer user, use the active client as a peer client of the at least one peer user and send a video call request to the peer client to request the peer client to establish a video call connection with the local client.

The second call request module includes a second information acquisition unit and a second client determination unit. The second information acquisition unit is configured to acquire binding user identification information in a binding relationship with target user identification information of the at least one peer user in application software corresponding to the local client to obtain user identification information of the at least one peer user, where the user identification information includes the target user identification information and the binding user identification information, and the binding user identification information and the target user identification information are identification information of the at least one peer user in different kinds of application software. The second client determination unit is configured to determine application software with highest activity of the at least one peer user among kinds of application software corresponding to the user identification information as active application software and determine a client of the active application software as the active client of the at least one peer user.

The video call apparatus provided in the embodiment of the present disclosure may perform the video call method provided in a corresponding embodiment of the present disclosure, and has functional modules and beneficial effects corresponding to the performed video call method. For technical details not described in detail in this embodiment, reference may be made to the video call method provided in the corresponding embodiment of the present disclosure.

Figure 12:
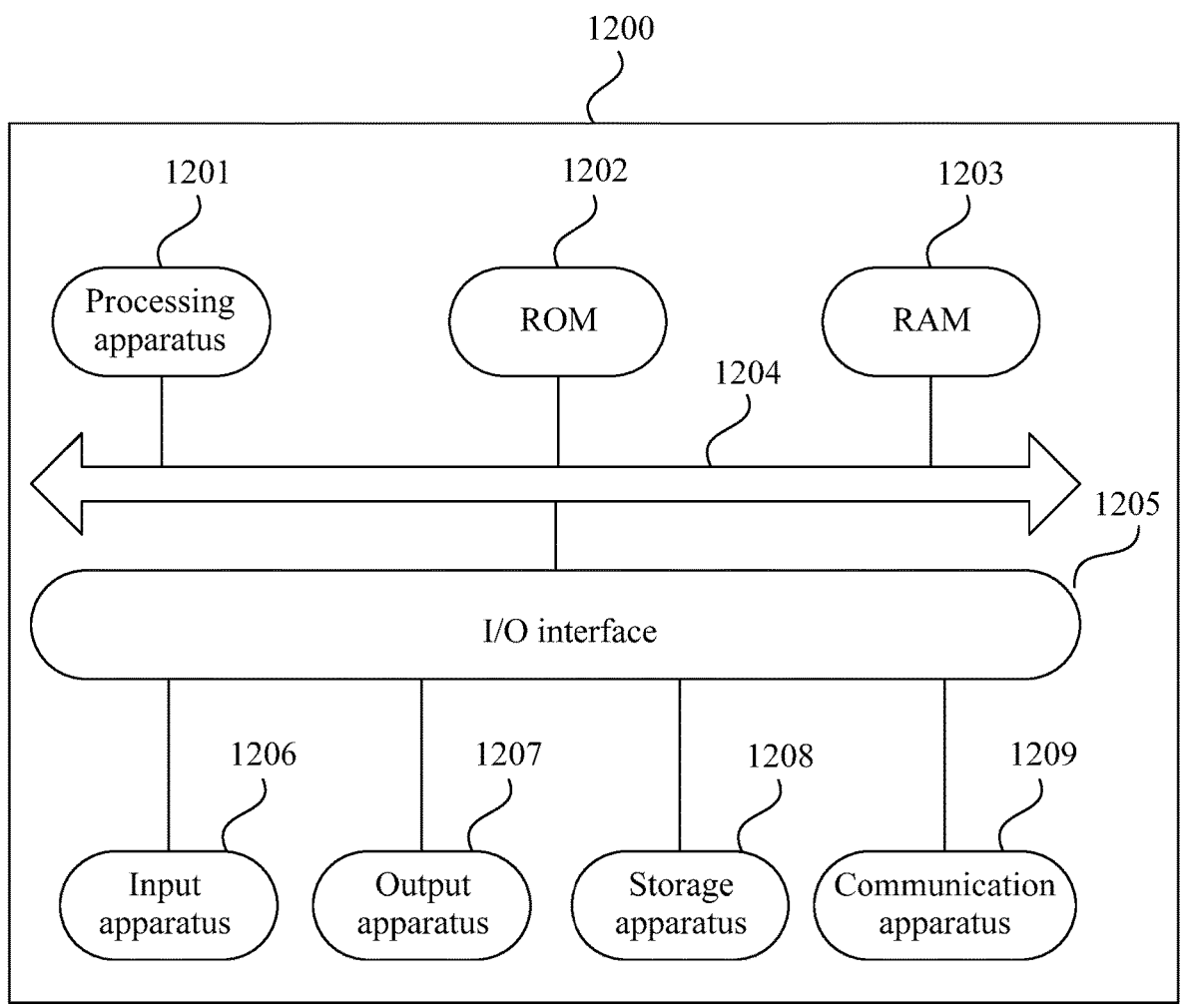
FIG. 12 is a structure diagram of an electronic device according to an embodiment of the present disclosure.

Referring to FIG. 12, FIG. 12 shows a structure diagram of an electronic device (such as the terminal device or server in FIG. 12) 1200 applicable to implementing the embodiments of the present disclosure. The terminal device in the embodiment of the present disclosure may include, but is not limited to, mobile terminals such as a mobile phone, a laptop, a digital broadcast receiver, a personal digital assistant (PDA), a portable android device (PAD), a portable media player (PMP) and an in-vehicle terminal (such as an in-vehicle navigation terminal), and stationary terminals such as a digital television (TV) and a desktop computer. The electronic device shown in FIG. 12 is merely an example and is not intended to limit the function and usage scope of the embodiments of the present disclosure.

As shown in FIG. 12, the electronic device 1200 may include a processing apparatus 1201 (such as a central processing unit or a graphics processing unit). The processing apparatus 1201 may perform various types of appropriate operations and processing based on a program stored in a read-only memory (ROM) 1202 or a program loaded from a storage apparatus 1208 to a random-access memory (RAM) 1203. Multiple programs and data required for the operation of the electronic device 1200 are also stored in the RAM 1203. The processing apparatus 1201, the ROM 1202 and the RAM 1203 are connected to each other through a bus 1204. An input/output (I/O) interface 1205 is also connected to the bus 1204.

Generally, the following apparatuses may be connected to the I/O interface 1205: an input apparatus 1206 such as a touch screen, a touch pad, a keyboard, a mouse, a camera, a microphone, an accelerometer and a gyroscope; an output apparatus 1207 such as a liquid crystal display (LCD), a speaker and a vibrator; the storage apparatus 1208 such as a magnetic tape and a hard disk; and a communication apparatus 1209. The communication apparatus 1209 may allow the electronic device 1200 to perform wireless or wired communication with other devices to exchange data. Although FIG. 12 illustrates the electronic device 1200 having various apparatuses, it is to be understood that not all the apparatuses illustrated herein need to be implemented or present. Alternatively, more or fewer apparatuses may be implemented or present.

According to the embodiments of the present disclosure, the processes described above with reference to a flowchart may be implemented as a computer software program. For example, a computer program product is included in the embodiments of the present disclosure. The computer program product includes a computer program carried in a non-transitory computer-readable medium. The computer program includes program codes for performing the method shown in the flowchart. In such an embodiment, the computer program may be downloaded from a network and installed through the communication apparatus 1209, or may be installed from the storage apparatus 1208, or may be installed from the ROM 1202. When the computer program is executed by the processing apparatus 1201, the preceding functions defined in the method of the embodiments of the present disclosure are performed.

It is to be noted that the preceding computer-readable medium in the present disclosure may be a computer-readable signal medium or a computer-readable storage medium or any combination thereof. The computer-readable storage medium may be, but is not limited to, for example, an electronic, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or in conjunction with an instruction execution system, apparatus or device. In the present disclosure, however, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal or any appropriate combination thereof. The computer-readable signal medium may also be any computer-readable medium other than the computer-readable storage medium. The computer-readable signal medium may send, propagate or transmit a program used by or in conjunction with an instruction execution system, apparatus or device. The program codes included on the computer-readable medium may be transmitted via any appropriate medium which includes, but is not limited to, a wire, an optical cable, a radio frequency (RF) or any appropriate combination thereof.

In some embodiments, clients and servers may communicate using any network protocol currently known or to be developed in the future, such as the HyperText Transfer Protocol (HTTP), and may be interconnected with any form or medium of digital data communication (such as a communication network). Examples of the communication network include a local area network (LAN), a wide area network (WAN), an internet (such as the Internet) and a peer-to-peer network (such as an Ad-Hoc network), as well as any network currently known or to be developed in the future.

The preceding computer-readable medium may be included in the preceding electronic device or may exist alone without being assembled into the electronic device.

The computer-readable medium carries one or more programs which, when executed by the electronic device, cause the electronic device to perform the steps below.

A video call page is displayed, where the video call page includes a display region of a video call image of each user making a video call, where the user includes a local user and a peer user; when a first trigger operation using a first target special effect is received, a first action object of the first target special effect is determined; if the first action object includes a target peer user, a special effect request is sent to a server to request an acquisition of a first special effect image where the first target special effect is added, where the first special effect image is used for being displayed at a client of at least one user; when the first special effect image forwarded by the server is received, a first video call image displayed in a first display region corresponding to the target peer user is updated as the first special effect image.

Alternatively, at least one pending request sent by at least one client establishing a video call connection is received, and a target pending request which is currently pending among the at least one pending request is determined; if the target pending request is a special effect request, special effect identification information of a target special effect which is requested to be added by the special effect request and a target peer user under an action of the target special effect are determined; a special effect instruction carrying the special effect identification information is generated, and the special effect instruction is sent to a target peer client of the target peer user to instruct the target peer client to display and send a special effect image where the target special effect is added; when the special effect image sent by the target peer client is received, the special effect image is forwarded to other clients which establish a video call connection with the target peer client for display.

Computer program codes for performing the operations in the present disclosure may be written in one or more programming languages or a combination thereof. The preceding one or more programming languages include, but are not limited to, object-oriented programming languages such as Java, Smalltalk and C++, as well as conventional procedural programming language such as C or similar programming languages. Program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN), or may be connected to an external computer (for example, via the Internet using an Internet service provider).

The flowcharts and block diagrams in the drawings show the possible architecture, function and operation of the system, method and computer program product according to multiple embodiments of the present disclosure. In this regard, each block in the flowcharts or block diagrams may represent a module, a program segment, or part of codes. The module, program segment, or part of codes contains one or more executable instructions for implementing specified logical functions. It is also to be noted that in some alternative implementations, the functions marked in the blocks may be implemented in an order different from those marked in the drawings. For example, two successive blocks may, in fact, be performed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which performs specified functions or operations or a combination of special-purpose hardware and computer instructions.

The described units involved in the embodiments of the present disclosure may be implemented in software or in hardware. The names of the units do not constitute a limitation on the units themselves in a certain case.

The functions described above herein may be performed, at least partially, by one or more hardware logic components. For example, without limitations, example types of hardware logic components that may be used include a field-programmable gate array (FPGA), an application-specific integrated circuit (ASIC), an application-specific standard product (ASSP), a system-on-chip (SoC), a complex programmable logic device (CPLD) and the like.

In the context of the present disclosure, a machine-readable medium may be a tangible medium that may include or store a program used by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any appropriate combination thereof. More specific examples of the machine-readable storage medium may include an electrical connection based on one or more wires, a portable computer disk, a hard disk, a random-access (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof.

According to one or more embodiments of the present disclosure, example 1 provides a video call method. The method includes the steps below.

A video call page is displayed, where the video call page includes a display region of a video call image of multiple users making a video call, where the multiple users include a local user and a peer user.

When a first trigger operation using a first target special effect is received, a first action object of the first target special effect is determined.

If the first action object includes a target peer user, a special effect request is sent to a server to request an acquisition of a first special effect image where the first target special effect is added, where the first special effect image is used for being displayed at a client of at least one of the multiple users.

When the first special effect image forwarded by the server is received, a first video call image displayed in a first display region corresponding to the target peer user is updated as the first special effect image.

According to one or more embodiments of the present disclosure, in example 2, according to the method of example 1, the step in which the first action object of the first target special effect is determined includes the step below.

A user corresponding to a target display region in a selected state is determined as the first action object of the first target special effect.

After the video call image is displayed, the method further includes the step below.

When a second trigger operation clicking on the target display region is received, the target display region is switched from an unselected state to the selected state.

According to one or more embodiments of the present disclosure, in example 3, according to the method of example 1, the step in which the first action object of the first target special effect is determined includes the step below.

A user corresponding to a target user control in a selected state is determined as the first action object of the first target special effect.

After the video call page is displayed, the method further includes the steps below.

A user control corresponding to each of the multiple users is displayed.

When a third trigger operation clicking on the target user control is received, the target user control is switched from an unselected state to the selected state.

According to one or more embodiments of the present disclosure, in example 4, according to the method of example 1, after the first video call image displayed in the first display region corresponding to the target peer user is updated as the first special effect image, the method further includes the steps below.

When a fourth trigger operation disabling a current target special effect is received, a second action object of the fourth trigger operation is determined. If the second action object includes the target peer user, a special effect disabling request is sent to the server to request the server to control a target peer client of the target peer user to display and send a first call image acquired by a camera of the target peer client to the server.

When the first call image forwarded by the server is received, the first video call image displayed in the first display region is updated as the first call image.

According to one or more embodiments of the present disclosure, in example 5, according to the method of example 1, the method further includes the steps below.

When a special effect instruction sent by the server is received, a second target special effect added as instructed by the special effect instruction is determined.

The second target special effect is added to a second call image acquired by a local camera to form a second special effect image.

A second video call image displayed in a second display region corresponding to the local user is updated as the second special effect image, and the second special effect image is sent as the second video call image of the local user to the server.

According to one or more embodiments of the present disclosure, in example 6, according to the method of example 5, the method further includes the steps below.

When a special effect disabling instruction sent by the server is received, the second video call image displayed in the second display region corresponding to the local user is updated as the second call image, and the second call image is sent as the second video call image of the local user to the server.

According to one or more embodiments of the present disclosure, in example 7, according to the method of any one of examples 1 to 6, before the video call page is displayed, the method further includes the steps below.

When a fifth trigger operation enabling the local user to make a video call with at least one peer user is received, a video call request carrying target user identification information of the at least one peer user is generated, and the video call request is sent to the server to request the server to control a peer client to establish a video call connection with a local client through the server, where the peer client is an active client of the at least one peer user.

According to one or more embodiments of the present disclosure, example 8 provides a video call method. The method includes the steps below.

At least one pending request sent by at least one client establishing a video call connection is received, and a target pending request which is currently pending among the at least one pending request is determined.

If the target pending request is a special effect request, special effect identification information of a target special effect which is requested to be added by the special effect request and a target peer user under an action of the target special effect are determined.

A special effect instruction carrying the special effect identification information is generated, and the special effect instruction is sent to a target peer client of the target peer user to instruct the target peer client to display and send a special effect image where the target special effect is added.

When the special effect image sent by the target peer client is received, the special effect image is forwarded to other clients that establish a video call connection with the target peer client for display.

According to one or more embodiments of the present disclosure, in example 9, according to the method of example 8, the method further includes the steps below.

If the target pending request is a special effect disabling request, a special effect disabling instruction is generated, and the special effect disabling instruction is sent to the target peer client to instruct the target peer client to display and send a call image acquired by a camera of the target peer client as a target video call image.

When the call image sent by the target peer client is received, the call image is forwarded to the other clients for display.

According to one or more embodiments of the present disclosure, in example 10, according to the method of example 8, the step in which the target pending request which is currently pending among the at least one pending request is determined includes the steps below.

A pending request whose receiving time is earliest is determined as the target pending request which is currently pending according to a sequence of receiving time of the at least one pending request.

According to one or more embodiments of the present disclosure, in example 11, according to the method of any one of examples 8 to 10, before the at least one pending request sent by the at least one client establishing the video call connection is received and the target pending request which is currently pending is determined, the method further includes the steps below.

When a video call request sent by any client is received, target user identification information of a peer user carried in the video call request is acquired.

An active client of the peer user is determined according to the target user identification information, the active client is used as a peer client of the peer user, and a call connection establishment request is sent to the peer client to establish a video call connection between the client sending the video call request and the peer client.

According to one or more embodiments of the present disclosure, in example 12, according to the method of example 11, the step in which the active client of the peer user is determined according to the target user identification information includes the steps below.

Binding user identification information in a binding relationship with the target user identification information is acquired to obtain user identification information of the peer user, where the user identification information includes the target user identification information and the binding user identification information, and the binding user identification information and the target user identification information are identification information of the peer user in different kinds of application software.

Application software with highest activity of the peer user among kinds of application software corresponding to the user identification information is determined as active application software, and a client of the active application software is determined as the active client of the peer user.

According to one or more embodiments of the present disclosure, example 13 provides a video call apparatus. The apparatus includes a first page display module, a first object determination module, a first special effect request module and a first image update module.

The first page display module is configured to display a video call page, where the video call page includes a display region of a video call image of multiple users making a video call, where the multiple users include a local user and a peer user.

The first object determination module is configured to determine, when receiving a first trigger operation using a first target special effect, a first action object of the first target special effect.

The first special effect request module is configured to send, when the first action object includes a target peer user, a special effect request to a server to request an acquisition of a first special effect image where the first target special effect is added, where the first special effect image is used for being displayed at a client of at least one of the multiple users.

The first image update module is configured to update, when receiving the first special effect image forwarded by the server, a first video call image displayed in a first display region corresponding to the target peer user as the first special effect image.

According to one or more embodiments of the present disclosure, example 14 provides a video call apparatus. The apparatus includes a request determination module, an information determination module, an instruction generation module and a special effect image forwarding module.

The request determination module is configured to receive at least one pending request sent by at least one client establishing a video call connection and determine a target pending request which is currently pending among the at least one pending request.

The information determination module is configured to determine, when the target pending request is a special effect request, special effect identification information of a target special effect which is requested to be added by the special effect request and a target peer user under an action of the target special effect.

The instruction generation module is configured to generate a special effect instruction carrying the special effect identification information and send the special effect instruction to a target peer client of the target peer user to instruct the target peer client to display and send a special effect image where the target special effect is added.

The special effect image forwarding module is configured to forward, when receiving the special effect image sent by the target peer client, the special effect image to other clients which establish a video call connection with the target peer client for display.

According to one or more embodiments of the present disclosure, example 15 provides an electronic device. The electronic device includes one or more processors and a memory configured to store one or more programs.

When executed by the one or more processors, the one or more programs cause the one or more processors to implement the video call method according to any one of examples 1 to 12.

According to one or more embodiments of the present disclosure, example 16 provides a computer-readable storage medium storing a computer program which, when executed by a processor, implements the video call method according to any one of examples 1 to 12.

Additionally, although multiple operations are depicted in a particular order, this should not be construed as that these operations are required to be performed in the particular order shown or in a sequential order. In certain circumstances, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, multiple features described in the context of a single embodiment may also be implemented in multiple embodiments individually or in any suitable sub-combination.

What is claimed is:

1. A video call method, comprising:
    displaying a video call page, wherein the video call page comprises a display region of a video call image of at least one user making a video call, wherein the at least one user comprises a local user and a peer user;
    in response to receiving a first trigger operation using a first target special effect, determining a first action object of the first target special effect;
    in response to determining that the first action object comprises a target peer user, sending a special effect request to a server to request an acquisition of a first special effect image where the first target special effect is added, wherein the first special effect image is used for being displayed at a client of the at least one user; and
    in response to receiving the first special effect image forwarded by the server, updating a first video call image displayed in a first display region corresponding to the target peer user as the first special effect image,
    wherein before displaying the video call page, the method further comprises:
    in response to receiving a fifth trigger operation enabling the local user to make a video call with at least one peer user, generating a video call request carrying target user identification information of the at least one peer user, and sending the video call request to the server to request the server to control the at least one peer client to establish a video call connection with a local client through the server, wherein the at least one peer client is an active client of the at least one peer user, the at least one peer client corresponds to at least one different application software, and wherein the active client of the at least one peer user is determined by the following manner: in a case where the at least one different application software corresponding to the at least one peer client is in an offline state, the active client is determined based on an online frequency and a length of time since a last online state of the at least one different application software corresponding to the at least one peer client.

2. The method according to claim 1, wherein determining the first action object of the first target special effect comprises:

determining a user corresponding to a target display region in a selected state as the first action object of the first target special effect; and wherein after displaying the video call page, the method further comprises:

in response to receiving a second trigger operation clicking on the target display region, switching the target display region from an unselected state to the selected state.

3. The method according to claim 1, wherein determining the first action object of the first target special effect comprises:

determining a user corresponding to a target user control in a selected state as the first action object of the first target special effect; and wherein after displaying the video call page, the method further comprises:

displaying a user control corresponding to each of the at least one user; and in response to receiving a third trigger operation clicking on the target user control, switching the target user control from an unselected state to the selected state.

4. The method according to claim 1, wherein after updating the first video call image displayed in the first display region corresponding to the target peer user as the first special effect image, the method further comprises:

in response to receiving a fourth trigger operation disabling a current target special effect, determining a second action object of the fourth trigger operation;

in response to determining that the second action object comprises the target peer user, sending a special effect disabling request to the server to request the server to control a target peer client of the target peer user to display and send a first call image acquired by a camera of the target peer client to the server; and in response to receiving the first call image forwarded by the server, updating the first video call image displayed in the first display region as the first call image.

5. The method according to claim 1, further comprising:

in response to receiving a special effect instruction sent by the server, determining a second target special effect added as instructed by the special effect instruction;

adding the second target special effect to a second call image acquired by a local camera to form a second special effect image; and updating a second video call image displayed in a second display region corresponding to the local user as the second special effect image, and sending the second special effect image as the second video call image of the local user to the server.

6. The method according to claim 5, further comprising:

in response to receiving a special effect disabling instruction sent by the server, updating the second video call image displayed in the second display region corresponding to the local user as the second call image, and sending the second call image as the second video call image of the local user to the server.

7. An electronic device, comprising:

at least one processor; and a memory configured to store at least one program, wherein when executed by the at least one processor, the at least one program causes the at least one processor to implement the video call method according to claim 1.

8. A non-transitory computer-readable storage medium storing a computer program which, when executed by a processor, implements the video call method according to claim 1.

9. A video call method, comprising:

receiving at least one pending request sent by at least one client which has established a video call connection, and determining a target pending request which is currently pending among the at least one pending request;

in response to determining that the target pending request is a special effect request, determining special effect identification information of a target special effect which is requested to be added by the special effect request and a target peer user under an action of the target special effect;

generating a special effect instruction carrying the special effect identification information, and sending the special effect instruction to a target peer client of the target peer user to instruct the target peer client to display and send a special effect image where the target special effect is added; and in response to receiving the special effect image sent by the target peer client, forwarding the special effect image to a client other than the target peer client which has established a video call connection with the target peer client for display, wherein before receiving the at least one pending request sent by the at least one client which has established the video call connection and determining the target pending request which is currently pending, the method further comprises:

in response to receiving a video call request sent by any client, acquiring target user identification information of a peer user carried in the video call request; and determining an active client of the peer user according to the target user identification information, using the active client as a peer client of the peer user, and sending a call connection establishment request to the peer client to establish a video call connection between the client sending the video call request and the peer client, wherein the peer client corresponds to at least one different application software, and wherein the active client of the at least one peer user is determined by the following manner: in a case where the at least one different application software corresponding to the at least one peer client is in an offline state, the active client is determined based on an online frequency and a length of time since a last online state of the at least one different application software corresponding to the at least one peer client.

10. The method according to claim 9, further comprising:

in response to determining that the target pending request is a special effect disabling request, generating a special effect disabling instruction, and sending the special effect disabling instruction to the target peer client to instruct the target peer client to display and send a call image acquired by a camera of the target peer client as a target video call image; and in response to receiving the target video call image sent by the target peer client, forwarding the target video call image to the client other than the target peer client for display.

11. The method according to claim 9, wherein determining the target pending request which is currently pending among the at least one pending request comprises:

determining a pending request whose receiving time is earliest as the target pending request which is currently pending according to a sequence of receiving time of the at least one pending request.

12. The method according to claim 9, wherein determining the active client of the peer user according to the target user identification information comprises:

acquiring binding user identification information in a binding relationship with the target user identification information to obtain user identification information of the peer user, wherein the user identification information comprises the target user identification information and the binding user identification information, and the binding user identification information and the target user identification information are identification information of the peer user in different kinds of application software; and determining application software with highest activity of the peer user among at least one kind of application software corresponding to the user identification information as active application software, and determining a client of the active application software as the active client of the peer user.

13. An electronic device, comprising:

at least one processor; and a memory configured to store at least one program, wherein when executed by the at least one processor, the at least one program causes the at least one processor to implement the video call method according to claim 8.

14. A non-transitory computer-readable storage medium storing a computer program which, when executed by a processor, implements the video call method according to claim 8.

* * * * *